United States Patent
Suzuki et al.

(10) Patent No.: US 8,049,365 B2
(45) Date of Patent: *Nov. 1, 2011

(54) POWER DEVICE AND POWER DEVICE POWER SUPPLY METHOD

(75) Inventors: Hiroshi Suzuki, Sagamihara (JP); Hiromi Matsushige, Hiratsuka (JP); Tetsuya Inoue, Odawara (JP); Masato Ogawa, Chigasaki (JP); Tomokazu Yokoyama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/578,789

(22) Filed: Oct. 14, 2009

(65) Prior Publication Data

US 2010/0033020 A1 Feb. 11, 2010

Related U.S. Application Data

(63) Continuation of application No. 11/635,569, filed on Dec. 8, 2006, now Pat. No. 7,612,467.

(30) Foreign Application Priority Data

Oct. 20, 2006 (JP) ................................. 2006-285709

(51) Int. Cl.
*H02J 9/00* (2006.01)

(52) U.S. Cl. ............................................ 307/64; 307/82
(58) Field of Classification Search .................... 307/64, 307/82
See application file for complete search history.

(56) References Cited

U.S. PATENT DOCUMENTS 7,243,248 B1   7/2007 Roux et al.
7,612,467 B2 * 11/2009 Suzuki et al. ................... 307/64

FOREIGN PATENT DOCUMENTS

JP           2004-126972           4/2004

* cited by examiner

*Primary Examiner* — Robert L. Deberadinis
(74) *Attorney, Agent, or Firm* — Brundidge & Stanger, P.C.

(57) ABSTRACT

A power device of the present invention makes a plurality of DC/DC converters redundant, and supplies power individually to a plurality of disk drives. Each first DC/DC converter is respectively made correspondent to a subgroup. One first DC/DC converter is connected to the disk drives respectively inside one subgroup, and the other first DC/DC converter is connected to the disk drives inside the other subgroup. A second DC/DC converter is made correspondent to all of the subgroups. Second DC/DC converters respectively supply direct-current power to any one disk drive of the disk drives in the subgroups.

6 Claims, 18 Drawing Sheets

FIG. 6

DRIVE MANAGEMENT TABLE (T1)

| DRIVE GROUP # (111) | SUBGROUP # (112) | DRIVE # (113) | RAID GROUP # (114) |
|---|---|---|---|
| DG01 | SG1-1 | D1-1 | RG1 |
| | | D1-2 | RG2 |
| | | D1-3 | RG3 |
| | | D1-4 | RG4 |
| | SG1-2 | D1-5 | RG5 |
| | | D1-6 | RG6 |
| | | D1-7 | RG7 |
| | | D1-8 | RG8 |
| | SG1-3 | D1-9 | RG9 |
| | | D1-10 | RG10 |
| | | D1-11 | RG11 |
| | | D1-12 | RG12 |
| | SG1-4 | D1-13 | RG13 |
| | | D1-14 | RG14 |
| | | D1-15 | RG15 |
| DG02 | SG2-1 | D2-1 | RG1 |
| | | D2-2 | RG2 |
| | | D2-3 | RG3 |
| | | D2-4 | RG4 |
| | SG2-2 | D2-5 | RG5 |
| | | D2-6 | RG6 |
| | | D2-7 | RG7 |
| | | D2-8 | RG8 |
| | | . . . | |

FIG. 7

| \_ | | | T2 |
|---|---|---|---|
| FIRST DC/DC CONVERTER MANAGEMENT TABLE ||||
| 121 | 122 | 123 | 124 |
| POWER CONTROLLER # | DC/DC # | TERMINAL # | DRIVE # |
| PS01 | DC1-1 | 1 | D1-1 |
| | | 2 | D1-2 |
| | | 3 | D1-3 |
| | | 4 | D1-4 |
| | DC1-2 | 1 | D1-5 |
| | | 2 | D1-6 |
| | | 3 | D1-7 |
| | | 4 | D1-8 |
| | DC1-3 | 1 | D1-9 |
| | | 2 | D1-10 |
| | | 3 | D1-11 |
| | | 4 | D1-12 |
| | DC1-4 | 1 | D1-13 |
| | | 2 | D1-14 |
| | | 3 | D1-15 |
| | DC1-5 | 1 | D2-1 |
| | | 2 | D2-2 |
| | | 3 | D2-3 |
| | | 4 | D2-4 |
| | DC1-6 | 1 | D2-5 |
| | | 2 | D2-6 |
| | | 3 | D2-7 |
| | | 4 | D2-8 |
| ... ||||

FIG. 8

SECOND DC/DC CONVERTER MANAGEMENT TABLE (T3)

| POWER CONTROLLER # (131) | DC/DC # (132) | TERMINAL # (133) | DRIVE # (134) |
|---|---|---|---|
| PS02 | DC2-1 | 1 | D1-1 |
| | | 2 | D1-5 |
| | | 3 | D1-9 |
| | | 4 | D1-13 |
| | DC2-2 | 1 | D1-2 |
| | | 2 | D1-6 |
| | | 3 | D1-10 |
| | | 4 | D1-14 |
| | DC2-3 | 1 | D1-3 |
| | | 2 | D1-7 |
| | | 3 | D1-11 |
| | | 4 | D1-15 |
| | DC2-4 | 1 | D1-4 |
| | | 2 | D1-8 |
| | | 3 | D1-12 |
| | DC2-5 | 1 | D2-1 |
| | | 2 | D2-5 |
| | | 3 | D2-9 |
| | | 4 | D2-13 |
| | DC2-6 | 1 | D2-2 |
| | | 2 | D2-6 |
| | | 3 | D2-10 |
| | | 4 | D2-14 |

...

POWER DEVICE AND POWER DEVICE POWER SUPPLY METHOD

CROSS-REFERENCE TO RELATED APPLICATIONS

This application relates to and claims priority from Japanese Patent Application No. 2006-285709 filed on Oct. 20, 2006, and is a continuation of application Ser. No. 11/635,569, filed on Dec. 8, 2006, now U.S. Pat. No. 7,612,467, the entire disclosures of which are incorporated herein by reference.

BACKGROUND OF THE INVENTION

1. Field of the Invention

The present invention is related to a power device and a power device power supply method capable of being used, for example, in a storage controller.

2. Description of the Related Art

A storage controller comprises a storage unit, which connects a large number of hard disk drives in an array, and provides a logical storage area (logical volume) to a server or other such host computer (hereinafter "host").

To heighten reliability and availability, the storage controller provides a host with a redundant storage area based on RAID (Redundant Array of Independent Disks). The storage controller also makes various resources, such as a microprocessor and communications channel redundant. In view of such high reliability and high availability, the power device of the storage controller is also made redundant.

Accordingly, in the prior art, a DC/DC converter is built into each hard disk drive (Japanese Laid-open Patent No. 2004-126972). Thus, in the prior art, even if a power failure occurs in one of the hard disk drives, this power failure is prevented from affecting the other hard disk drives.

In the prior art described in the above literature, since a DC/DC converter is built into each hard disk drive, each DC/DC converter must be capable of outputting power proportional to the maximum power consumption of each hard disk drive. Therefore, it is necessary to provide DC/DC converters, which have sufficient output performance, for the total number of hard disk drives, raising power costs. Further, since it is necessary to provide the same number of DC/DC converters as the number of hard disk drives, the number of components and inventory increase, and power productivity decreases.

Since the output capacity of the respective DC/DC converters is set in accordance with the maximum power consumption of the respective hard disk drives, it is also necessary to increase the output capacity of AC/DC converters for respectively supplying direct-current power to the DC/DC converters. Thus, power device costs increase, and the size of the device also becomes larger.

Further, in the prior art, because each hard disk drive has a built in DC/DC converter, it is impossible to operate a hard disk drive when a power failure occurs in a DC/DC converter.

Additionally, in the prior art, each hard disk drive respectively comprises only one DC/DC converter, and the DC/DC converter does not have a redundant constitution. Therefore, it is impossible to replace the DC/DC converter alone.

Further, in the prior art, when a power failure occurs, it is not possible to specify whether the cause is a DC/DC converter failure, or whether the cause is a failure of another circuit inside the hard disk drive. Therefore, the entire hard disk drive must be replaced when a power failure occurs.

SUMMARY OF THE INVENTION

With the foregoing in mind, it is an object of the present invention to provide a power device and a power device power supply method, which are capable of efficiently supplying direct-current power to a storage device, and which can enhance failure resistance. Another object of the present invention is to provide a power device and a power device power supply method, which are capable of individually controlling whether or not direct-current power is supplied to each storage device. Yet further objects of the present invention will become clear from the descriptions of the embodiments explained here in below.

In order to solve for the above problems, a power device according to one aspect of the present invention is a power device for supplying power to a plurality of storage devices comprising a first direct-current power input port and a second direct-current power input port, into which direct-current power is respectively inputted, comprising a plurality of first direct-current power units for supplying direct-current power to the first direct-current power input ports of the storage devices; a plurality of second direct-current power units for supplying the same direct-current power as the direct-current power being outputted from the first direct-current power units to the second direct-current power input ports of the storage devices; and a power controller for respectively controlling each first direct-current power unit and each second direct-current power unit, wherein the storage devices are grouped into a plurality of subgroups each having a plurality of storage devices, the first direct-current power units and second direct-current power units are respectively provided in the same numbers as the number of subgroups, the first direct-current power units are respectively made correspondent to any one of the subgroups of the respective subgroups, and respectively supply direct-current power to the first direct-current power input ports of the storage devices in the corresponding subgroups, and the second direct-current power units are respectively made correspondent to all of the subgroups, and with respect to each subgroup, respectively supply direct-current power to the second direct-current power input ports of any one of the storage devices of the storage devices in the respective subgroups.

In one mode of the present invention, the power controller individually controls the supply and cutoff of power to each storage device by controlling the power supply operations of a prescribed first direct-current power unit and a prescribed second direct-current power unit, which respectively supply direct-current power to a prescribed storage device, of the respective first direct-current power units and second direct-current power units.

In one mode of the present invention, the power controller supplies power to a prescribed storage device by respectively stopping the power supplies of a prescribed first direct-current power unit and a prescribed second direct-current power unit, stopping the power supply to a prescribed storage device, and respectively resuming the power supply of the prescribed first direct-current power unit and the prescribed second direct-current power unit.

In one mode of the present invention, the power controller first resumes the power supply of any one of either the prescribed first direct-current power unit or the prescribed second direct-current power unit, and thereafter, resumes the power supply of the other.

In one mode of the present invention, the power controller first resumes the power supply of any one of either the prescribed first direct-current power unit or the prescribed second direct-current power unit, and thereafter, upon the passage of a preset prescribed time, resumes the power supply of the other.

In one mode of the present invention, the power controller (1) respectively acquires the states of the first direct-current power units and the second direct-current power units, (2) upon detecting a failure only in any one of the respective first direct-current power units or respective second direct-current power units, outputs a warning regarding the direct-current power unit in which the failure has been detected, (3) upon detecting failures respectively in a first direct-current power unit and a second direct-current power unit, which, of the first direct-current power units and second direct-current power units, respectively supply direct-current power to the same storage device, acquires the state of the storage device connected respectively to the first direct-current power unit and second direct-current power unit in which these failures have been detected, and, based on the acquired state, determines if a failure occurred in the storage device, (4) upon determining that a failure occurred in the storage device, outputs a warning regarding the storage device, and (5) upon determining that a failure has not occurred in the storage device, outputs warnings regarding the first direct-current power unit and second direct-current power unit in which failures have been respectively detected.

A power supply method of a power device according to another aspect of the present invention is a power supply method of a power device comprising: a plurality of storage devices, which comprise a first direct-current power input port and a second direct-current power input port into which direct-current power is respectively inputted; a plurality of first direct-current power units for supplying direct-current power to the first direct-current power input port of the respective storage devices; a plurality of second direct-current power units for supplying the same direct-current power as the direct-current power being outputted from a first direct-current power unit to the second direct-current power input port of the respective storage devices; and a power controller for respectively controlling the first direct-current power units and the second direct-current power units, wherein the respective storage devices are grouped into a plurality of subgroups each having a prescribed plurality of storage devices, the respective first direct-current power units and respective second direct-current power units are respectively provided in the same numbers as the number of subgroups, the first direct-current power units are each made correspondent to any one of the subgroups of the respective subgroups, direct-current power is respectively supplied from the first direct-current power units to the first direct-current power input ports of the respective storage devices in the corresponding subgroups, the second direct-current power units are each made correspondent to all of the respective subgroups, and, with respect to each subgroup, direct-current power is respectively supplied from the respective second direct-current power units to the second direct-current power input port of any one of the storage devices of the respective storage devices in the respective subgroups.

A power device, which accords with yet another aspect of the present invention, and which is utilized in a storage controller that provides a logical volume to a higher-level device, the storage controller comprising a plurality of storage devices, which comprise a first direct-current power input port and a second direct-current power input port into which direct-current power is respectively inputted; a plurality of load groups, which are respectively formed from the plurality of storage devices; a parity group, which is formed in accordance with a plurality of storage devices respectively selected from different load groups, and in which the logical volume is provided; a controller, which inputs and outputs data to and from the logical volume in accordance with an instruction from the higher-level device; and a plurality of subgroups, which are formed by dividing up the respective load groups, and which respectively comprise a plurality of storage devices, the storage controller further comprising: a plurality of first direct-current power units, which are provided in a one-to-one correspondence with the respective subgroups, and which respectively supply direct-current power to the first direct-current power input ports of the storage devices in the subgroups; a plurality of second direct-current power units, which are respectively made correspondent to all of the subgroups, and which, with respect to each subgroup, respectively supply the same direct-current power as the direct-current power outputted from a first direct-current power unit to a second direct-current power input port of any one storage device of the storage devices in the subgroups; and a power controller for respectively controlling the first direct-current power units and the second direct-current power units.

BRIEF DESCRIPTION OF THE DRAWINGS

FIG. 6 is a schematic diagram showing a table configuration for managing a disk drive;

FIG. 7 is a schematic diagram showing a table configuration for managing a first DC/DC converter;

FIG. 8 is a schematic diagram showing a table configuration for managing a second DC/DC converter;

DESCRIPTION OF THE PREFERRED EMBODIMENTS

Figure 1:
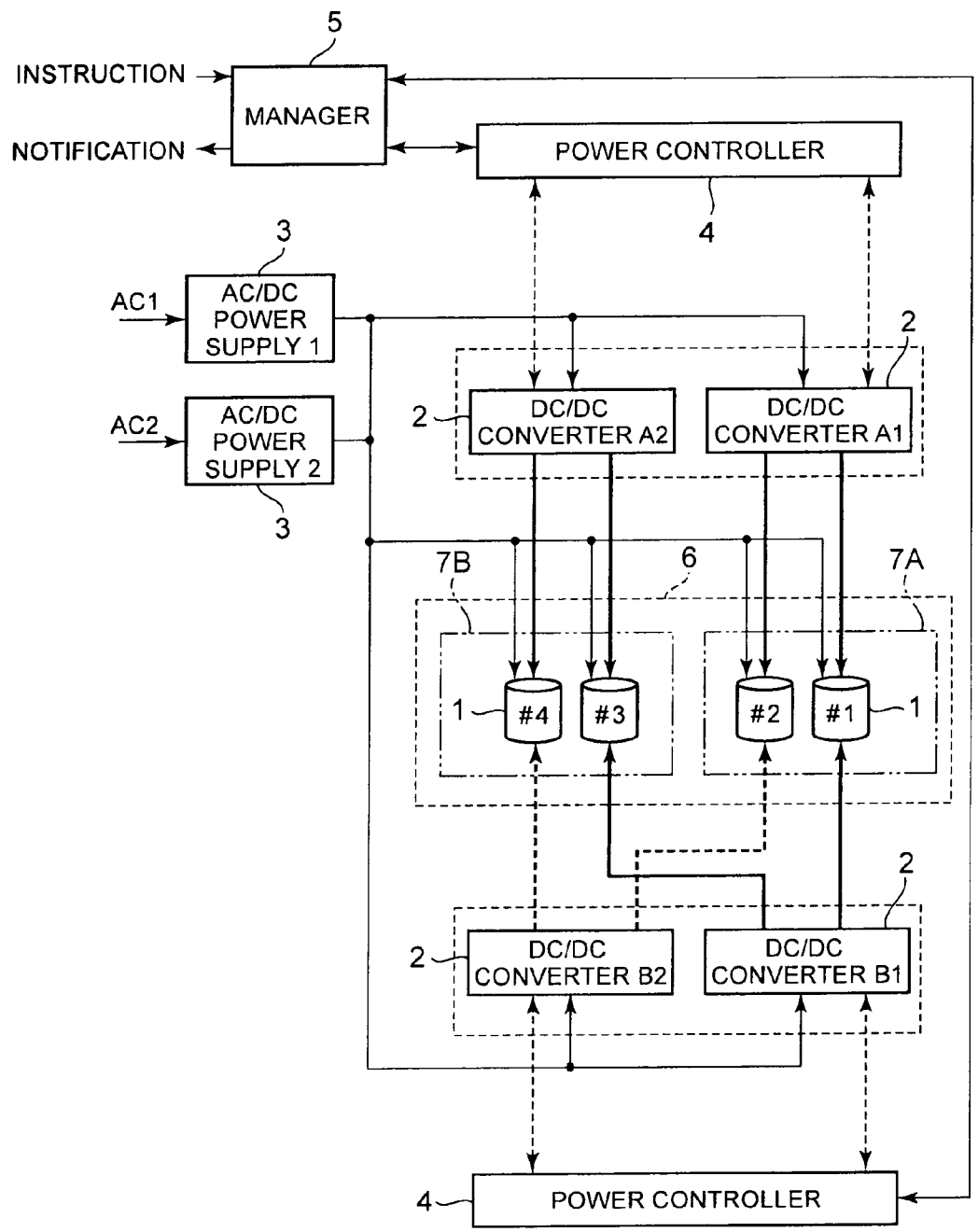
FIG. 1 is a schematic diagram showing the concept of an embodiment of the present invention.

An embodiment of the present invention will be explained here in below based on the figures. This embodiment will be explained by giving a power device of a storage controller as an example. FIG. 1 is a schematic diagram showing an overall concept of a power device related to this embodiment.

A storage controller comprises a plurality of disk drives 1. A disk drive 1 is equivalent to a "storage device." For example, a hard disk drive, semiconductor memory device, flash memory device, optical disk drive, magneto-optic disk drive, and magnetic tape device can be used as a storage device.

A plurality of disk drives 1 constitute one drive group 6. A drive group 6, for example, is a group of a plurality of disk drives 1 disposed inside the same enclosure, and power is supplied to each drive group. The drive group 6 is equivalent to a "load group," and differs from a parity group, which is a logical group.

One drive group 6 is divided into a plurality of subgroups 7A, 7B. In FIG. 1, subgroups 7A, 7B are set such that the number of disk drives 1 in each subgroup 7A, 7B constitutes the same number. However, as will become clear from the embodiment explained here in below, the number of disk drives 1 constituting the respective subgroups 7A, 7B does not necessarily have to be the same.

In the example shown in FIG. 1, one subgroup 7A is constituted from a plurality of disk drives 1 (#1, #2). The other subgroup 7B is constituted from another plurality of disk drives 1 (#3, #4).

A power device, for example, is constituted comprising a plurality of DC/DC converters 2, a plurality of AC/DC converters 3, a plurality of power controllers 4, and at least one management unit 5. The power device respectively supplies direct-current power, such as 5 volts and 12 volts of direct-current, to the respective disk drives 1. Furthermore, the power device also supplies direct-current power to other parts of the storage controller. As the other parts, a controller for controlling the overall operation of the storage controller can be cited. The overall constitution of the storage controller will be made clear in an embodiment to be explained below.

The DC/DC converters 2 are disposed on the outside of the hard disk drives 1. The DC/DC converters 2 convert direct-current power inputted from an AC/DC converter 3 (for example, 12 volts of direct-current) to a low-voltage direct-current power (for example, 5 volts of direct-current), and respectively supply this power to corresponding disk drives 1.

The DC/DC converters 2 can be broadly divided into first DC/DC converters 2 (A1, A2) shown in the upper portion of FIG. 1, and second DC/DC converters 2 (B1, B2) shown in the bottom portion of FIG. 1. The first DC/DC converters 2 (A1, A2) respectively correspond to the "first direct-current power unit" and the second DC/DC converters 2 (B1, B2) respectively correspond to the "second direct-current power unit."

The first DC/DC converters 2 (A1, A2) are respectively made correspondent to one of the subgroups 7A, 7B. That is, one first DC/DC converter 2 (A1) is made correspondent to one subgroup 7A, and the other one first DC/DC converter 2 (A2) is made correspondent to the other subgroup 7B, respectively.

Then, the output terminals of the one first DC/DC converter 2 (A1) are respectively connected to the power input terminals of the respective disk drives 1 (#1, #2) constituting the subgroup 7A, and, for example, respectively supply direct-current power of around 5 volts of direct-current. Similarly, the output terminals of the other first DC/DC converter 2 (A2) are respectively connected to the power input terminals of the respective disk drives 1 (#3, #4) constituting the subgroup 7B, and, for example, respectively supply direct-current power of around 5 volts of direct-current.

The second DC/DC converters 2 (B1, B2) are respectively made correspondent to all the subgroups 7A, 7B. That is, one second DC/DC converter 2 (B1) is made correspondent to subgroups 7A and 7B, and the other one second DC/DC converter 2 (B2) is also made correspondent to subgroups 7A and 7B.

Then, the second DC/DC converters 2 (B1, B2) respectively supply direct-current power to any one disk drive 1 of the respective disk drives 1 inside the subgroups 7A, 7B. That is, one of the second DC/DC converters 2 (B1) connects respectively to disk drive 1 (#1) inside subgroup 7A, and to disk drive 1 (#3) inside subgroup 7B. The other second DC/DC converter 2 (B2) connects respectively to disk drive 1 (#2) inside subgroup 7A, and to disk drive 1 (#4) inside subgroup 7B.

In other words, the respective second DC/DC converters 2 (B1, B2) are respectively connected to disk drives 1 on the same level inside the respective subgroups 7A, 7B. That is, in subgroup 7A, disk drive 1 (#1) is the first level, and disk drive 1 (#2) is the second level. In subgroup 7B, disk drive 1 (#3) is the first level, and disk drive 1 (#4) is the second level.

From the standpoint of the levels inside a subgroup, the output terminals of the one second DC/DC converter 2 (B1) are respectively connected to the power input terminals of the first level disk drives 1 (#1, #3) inside the respective subgroups 7A, 7B, and the output terminals of the other second DC/DC converter 2 (B2) are respectively connected to the power input terminals of the second level disk drives 1 (#2, #4) inside the respective subgroups 7A, 7B.

Thus, each disk drive 1 inside the respective subgroups 7A, 7B is respectively connected to a plurality of DC/DC converters. That is, disk drive 1 (#1) is respectively connected to first DC/DC converter 2 (A1) and second DC/DC converter 2 (B1), disk drive 1 (#2) is respectively connected to first DC/DC converter 2 (A1) and second DC/DC converter 2 (B2), disk drive 1 (#3) is respectively connected to first DC/DC converter 2 (A2) and second DC/DC converter 2 (B1), and disk drive 1 (#4) is respectively connected to first DC/DC converter 2 (A2) and second DC/DC converter 2 (B2).

The respective AC/DC converters 3 are respectively connected to the DC/DC converters 2, and respectively supply direct-current power of around 12 volts of direct-current. Further, the AC/DC converters 3 also supply direct-current power of around 12 volts of direct-current to the respective disk drives 1. The AC/DC converters 3 are connected in logical OR fashion. That is, even if the operation of any one of the AC/DC converters 3 stops, direct-current power is respectively supplied to the DC/DC converters 2 and disk drives 1 from the other AC/DC converter 3.

The power controllers 4 are constituted as electronic circuits, which respectively control the operation of the DC/DC converters 2. A power controller 4 is provided for each of the first DC/DC converters 2 (A1, A2) and second DC/DC converters 2 (B1, B2). That is, a first power controller 4 shown in the upper portion of FIG. 1 is in charge of controlling the first DC/DC converters 2 (A1, A2), and a second power controller 4 shown in the lower portion of FIG. 1 is in charge of controlling the second DC/DC converters 2 (B1, B2).

The power controllers 4, based on instructions inputted via the management unit 5, either output direct-current power from the DC/DC converters 2, or stop the output from the DC/DC converters 2. Further, the power controllers 4 acquire the states of the DC/DC converters 2 under their respective control, and notify these acquired states to the management unit 5. For example, each DC/DC converter 2 outputs signals to a power controller 4 indicating whether or not the DC/DC converter 2 itself is operating normally. The power controllers 4 can detect whether or not the respective DC/DC converters 2 are operating normally by reading these signals from the respective DC/DC converters 2.

The management unit 5 is respectively connected to the power controllers 4. The management unit 5 is for respectively managing the power controllers 4.

A power device of this embodiment comprises the above-described constitution. Therefore, even is a power failure should occur in any one of the disk drives 1, the affects of this power failure can be prevented from reaching the other disk drives 1, thereby enhancing reliability.

This will be explained using an example. For example, it is supposed that a short circuit occurs in a line through which five volts of direct-current are flowing inside disk drive 1 (#1). In this case, in the respective DC/DC converters 2 (A1, B1), which are connected to the disk drive 1 (#1) that short-circuited internally, protection circuits, such as an overcurrent protection circuit or a low-voltage detection circuit, operate. Therefore, the respective operations of the DC/DC converters 2 (A1, B1) are stopped.

Stopping the operation of first DC/DC converter 2 (A1) stops the supply of direct-current power to the disk drives 1 (#1, #2) from first DC/DC converter 2 (A1). However, direct-current power is supplied to disk drive 1 (#2) from second DC/DC converter 2 (B2). Therefore, disk drive 1 (#2) continues to operate.

Stopping the operation of second DC/DC converter 2 (B1) stops the supply of direct-current power to the disk drives 1 (#1, #3) from second DC/DC converter 2 (B1). However, direct-current power is supplied to disk drive 1 (#3) from first DC/DC converter 2 (A2). Therefore, disk drive 1 (#3) continues to operate.

The same holds true when a power failure occurs in any of the other disk drives 1. The operation of the DC/DC converters 2 connected to the disk drive 1 in which the power failure occurred is stopped. However, direct-current power is supplied to the other, normal disk drives 1 from at least one or more DC/DC converters 2. In other words, in a power device of this embodiment, because the DC/DC converters 2 provided on the outside of the disk drives 1 feature a redundant constitution, even if a power failure occurs in any one disk drive 1, the affects of this power failure can be prevented from spreading to the other, normal disk drives 1.

As described hereinabove, in this embodiment, the constitution is such that the first DC/DC converters 2 (A1, A2) are respectively correspondent to the disk drives 1 inside the corresponding subgroups 7A, 7B, the second DC/DC converters 2 (B1, B2) are respectively correspondent to any one of the disk drives 1 inside all of the subgroups 7A, 7B, and the disk drives 1 are respectively supplied with power from both the first DC/DC converters 2 and second DC/DC converters 2.

Therefore, the power supply to each of the disk drives 1 can be controlled individually. For example, referring the above described example, by respectively stopping the operations of first DC/DC converters 2 (A1) and second DC/DC converters 2 (B1), it is possible to stop only the power supply to disk drive 1 (#1). In this case, since the direct-current power is supplied from a separate DC/DC converter 2 to the other disk drives 1 (#2 through #4), the stoppage has no affect on the operation of the other disk drives 1 (#2 through #4).

Thus, in this embodiment, it is possible to individually control the respective supplies of direct-current power to the disk drives 1 in accordance with the DC/DC converters 2 provided outside the disk drives 1. Therefore, when replacing a disk drive 1 in line with maintenance work, it is possible to stop only the power supply to the disk drive 1 targeted for replacement, and to replace it with a new disk drive 1. Then, it is possible to supply direct-current power to the new disk drive 1 and put it in an operable state.

Thus, in this embodiment, it is not necessary to provide a disk drive 1 with an electrical circuit for hot swapping. This is because a disk drive 1 can be removed after completely stopping the power supply, and then, the power supply can be resumed after mounting a new disk drive 1. Therefore, the manufacturing cost of a disk drive 1 can be reduced as there is no need to provide a DC/DC converter on the inside of a disk drive 1, and also no need to provide an electrical circuit that enables hot swapping.

Further, in this embodiment, the constitution is such that a disk drive 1 and a DC/DC converter 2 are provided separately, and a plurality of disk drives 1 are group managed by a plurality of DC/DC converters 2. Therefore, the number of DC/DC converters 2 can be greatly reduced compared to the prior art, and the manufacturing costs of the power device can be lowered.

Furthermore, in this embodiment, as described hereinabove, since it is possible to individually control the supply of power to the respective disk drives 1, it is also possible to specify the location of a power failure. That is, when a certain disk drive 1 stops operating, a DC/DC converter 2, which is supplying direct-current power to the disk drive 1 that has stopped operating, confirms whether or not operation has stopped. If any of the DC/DC converters 2 have been stopped, it is possible to determine that a power failure occurred inside a disk drive 1. A power device of this embodiment will be explained in detail here in below.

First Embodiment

Figure 2:
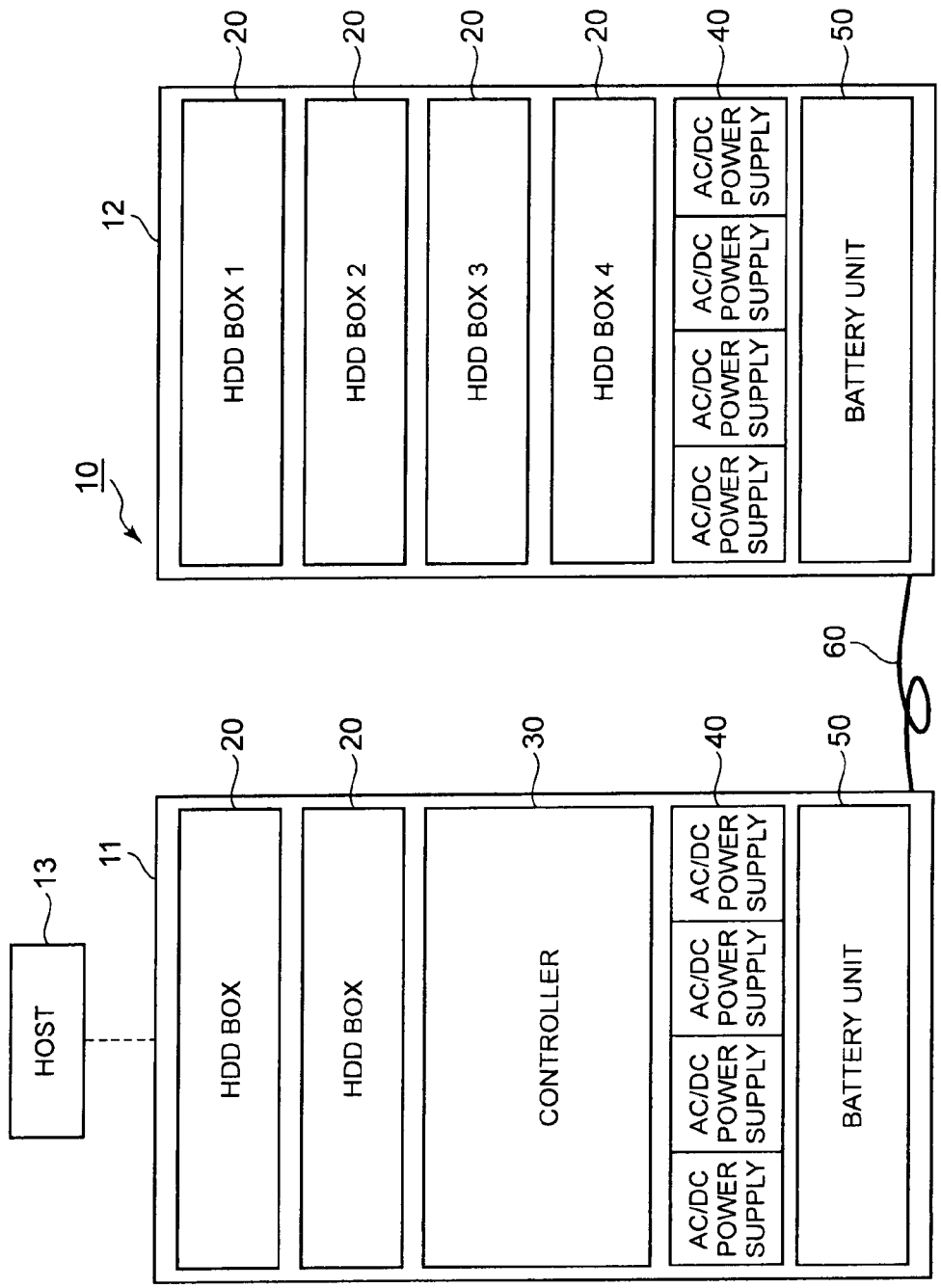
FIG. 2 is a schematic diagram schematically showing the overall constitution of a storage controller.

FIG. 2 is a schematic diagram schematically showing the constitution of a storage controller 10. FIG. 2 is represented to look like a front view, but it differs from an actual front view.

The storage controller 10, for example, can be constituted by connecting a basic enclosure 11 and an expansion enclosure 12 with a cable 70. The storage controller 10 can also be constituted from the basic enclosure 11 alone.

The basic enclosure 11 comprises a basic constitution of the storage controller 10, and the fundamental functions of the storage controller 10 can be realized via the basic enclosure 11 alone. The basic enclosure 11, for example, is constituted comprising a plurality of hard disk boxes (hereinafter, HDD boxes) 20; a controller 30; an AC/DC power unit 40; and a battery unit 50. A host 13 is connected as a higher-level device to the basic enclosure 11 via a communications network.

The expansion enclosure 12 is prepared as an optional component, and is used for expanding the storage capacity of the storage controller 10. The expansion enclosure 12, for example, comprises a plurality of HDD boxes 20; an AC/DC power unit 40; and a battery unit 50. The respective enclosures 11, 12 each comprise an independent power constitution. Furthermore, the constitution of the storage controller 10 is not limited to that shown in FIG. 2. For example, the constitution can also eliminate the HDD boxes from the basic enclosure 11, and provide only control functions.

Figure 3:
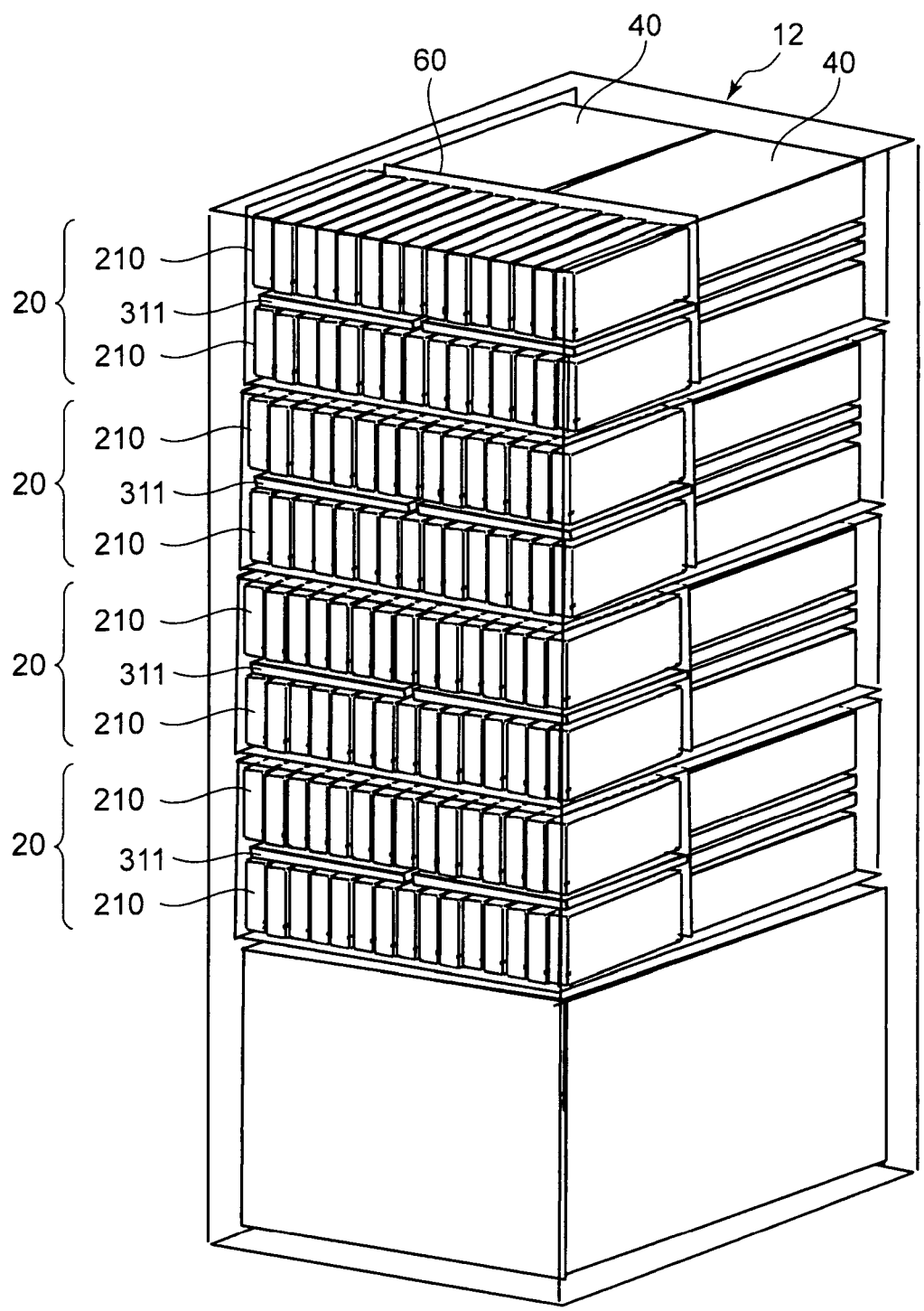
FIG. 3 is an oblique view showing the constitution of hard disk drives.

The respective HDD boxes 20 comprise a plurality of disk drives 210 (Refer to FIG. 3). The constitution of each HDD box 20 will be explained here in below. The controller 30 is in charge of the control functions of the storage controller 10. The constitution of the controller 30 will be explained below together with FIG. 4.

The AC/DC power unit 40 converts the alternating current power supplied from outside, for example, to a direct-current power of around 12 volts. Furthermore, the voltage value is merely an example, and the present invention is not limited to the voltage values disclosed in the embodiments. The same holds true for the following explanations as well.

The battery unit 50, for example, supplies emergency direct-current power when alternating current power from the outside is shut off by a power outage or the like. Thus, when a power outage or the like occurs, write data stored in a cache memory 130 (Refer to FIG. 4) is written to a disk drive 210 using power from the battery unit 50.

FIG. 3 is an external view of the expansion enclosure 12. The expansion enclosure 12, for example, comprises four HDD boxes 20 in the front thereof. Fifteen (15) disk drives 210 are respectively mounted in each of the top and bottom of each HDD box 20. The 15 disk drives 210 of a top tier constitute one drive group 214 (Refer to FIG. 5), and the 15 disk drives 210 of a bottom tier constitute a separate drive group 214. That is, a plurality of drive groups 214 are disposed in each HDD box 20.

Figure 4:
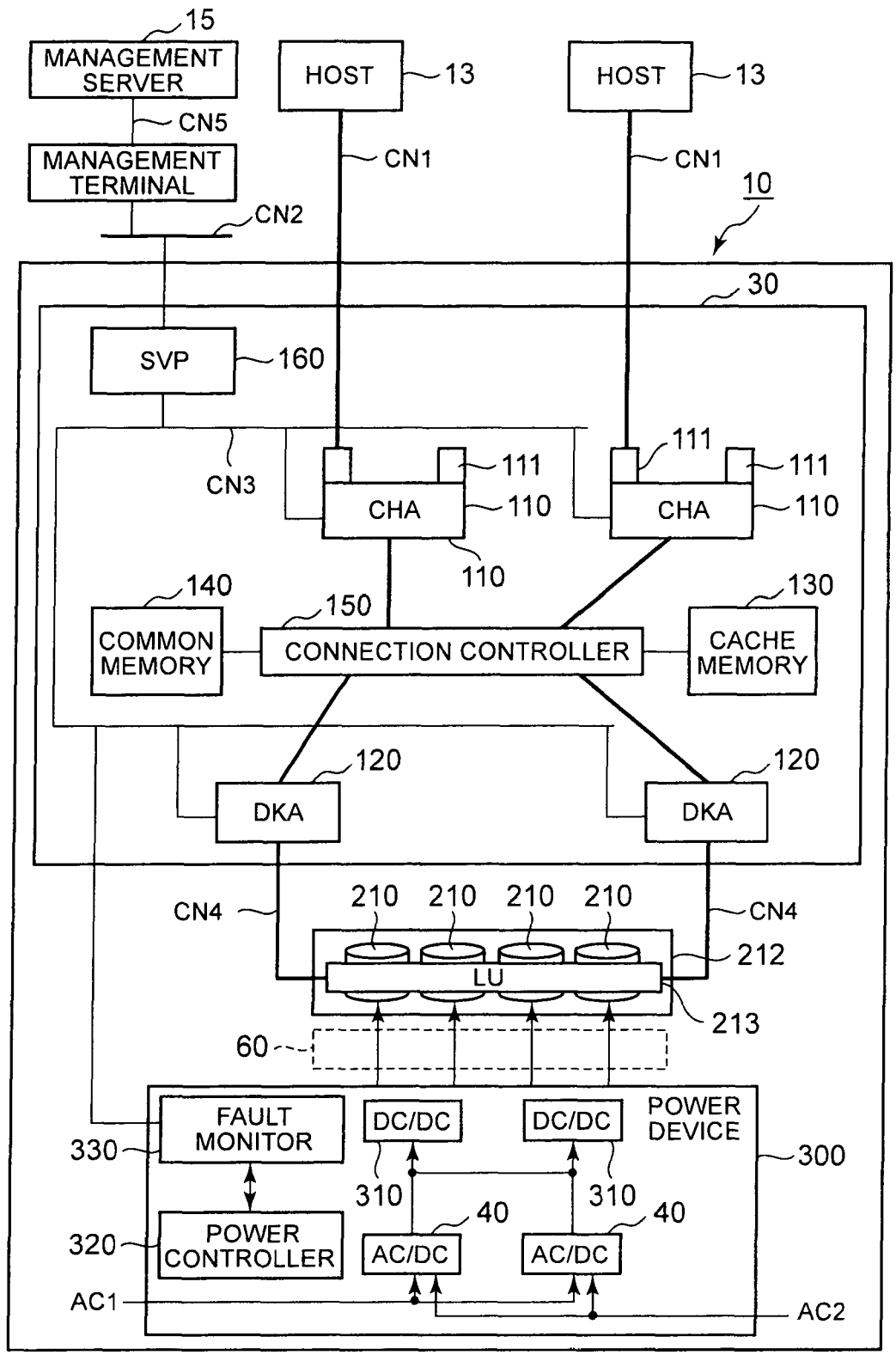
FIG. 4 is a block diagram of a storage controller.

Between the row of disk drives 210 of a top tier and the row of disk drives 210 of a bottom tier are disposed two DC/DC boards 311 to which are mounted a plurality of DC/DC converters 310 (Refer to FIG. 4). The constitution of a DC/DC board 311 will be explained further below.

Further, a plurality of AC/DC converters 40 are provided via a backboard 60 at the rear of the HDD boxes 20. That is, a backboard 60 for electrically connecting respective parts is provided between the disk drives 210 and AC/DC converters 40.

A redundant constitution relative to the supply of direct-current power, which will be explained below, is respectively achieved in each HDD box 20. Furthermore, a fibre connection controller (the interface circuit 340 of FIG. 11) for connecting the respective disk drives 210 and the controller 30 (Refer to FIG. 4) is also provided inside an HDD box 20.

A disk drive 210 of this embodiment, for example, is constituted as a hard disk drive, such as an ATA (AT Attachment) disk, SCSI (Small Computer System Interface) disk, and FC (Fibre Channel) disk. But disk drive 210 is not limited thereto, and, for example, can also make use of other storage devices, such as a semiconductor memory drive (including a flash memory device), optical disk drive, and magneto-optic disk drive. Disk drive 210 corresponds to disk drive 1 in FIG. 1.

Furthermore, details will be explained below, but, for example, a RAID group 212 (Refer to FIG. 4) is constituted from a prescribed number of disk drives 210, such as four drives per group, or eight drives per group. A RAID group 212 is constituted so as to extend across respectively different drive groups 214. That is, a RAID group 212 is constituted from a plurality of disk drives 210 selected from within respectively separate drive groups 214.

FIG. 4 is a block diagram of the storage controller 10. First, an overall storage system comprising the storage controller 10 will be explained, and next, the controller 30 will be explained in detail.

The storage controller 10 is connectable to a plurality of hosts 13 by way of a communications network CN1. A host 13, for example, accesses the storage controller 10 in accordance with a request from a client terminal not shown in the figure, and reads and writes data. For example, a mainframe computer or a server computer can be cited as a host 13. For example, a LAN (Local Area Network), SAN (Storage Area Network), the Internet, or a leased line can be listed as the communications network CN1.

When using a LAN, a host computer 13 and the storage controller 10 carry out communications in accordance with TCP/IP (Transmission Control Protocol/Internet Protocol).

When using a SAN, a host computer 13 and the storage controller 10 carry out communications in accordance with the Fibre Channel Protocol. Also, when the host computer 13 is a mainframe computer, for example, the transfer of data is carried out in accordance with a communications protocol, such as FICON (Fibre Connection: Registered Trademark), ESCON (Enterprise System Connection: Registered Trademark), ACONARC (Advanced Connection Architecture: Registered trademark), or FIBARC (Fibre Connection Architecture: Registered Trademark).

A management terminal 14 can also be connected to the storage controller 10 via a communications network CN2 for management use. The management terminal 14 is a computer terminal for performing the various settings of the storage controller 10. The management terminal 14 can connect to a management server 15 via a communications network CN5. The management server 15 is a computer apparatus capable of managing a plurality of storage controllers 10 in batches. For example, a LAN and the Internet can be listed as communications networks CN2, CN5.

Next, the constitution of the controller 30 will be explained. The controller 30, for example, can have a constitution comprising a channel adapter (hereinafter, CHA) 110, a disk adapter (hereinafter, DKA) 120, a cache memory 130, a common memory 140, a connection controller 150, and a service processor (hereinafter, SVP) 160.

The respective CHA 110 control the transfer of data with hosts 13, and comprise a plurality of communication ports 111. A plurality of CHA 110 can be provided in the storage controller 10. A CHA 110, for example, is provided in accordance with the type of host 13, such as an open system server CHA, mainframe system CHA, and so forth. The respective CHA 110 receive commands from the hosts 13 to which they are respectively connected requesting data read/write operations, and operate in accordance with the commands received from the hosts 13.

A plurality of DKA 120 can be provided inside a storage controller 10. The respective DKA 120 control data communications between the storage controller 10 and the disk drives 210. The respective DKA 120, for example, are connected to the respective disk drives 210 via a SAN or other such communications network CN4, and carry out data transfer in blocks in accordance with the Fibre Channel Protocol. The DKA 120 constantly monitor the states of the disk drives 210, and the results of this monitoring are sent to the SVP 160 by way of an internal network CN3.

Furthermore, the CHA 110 and DKA 120 can also be respectively constituted as separate control circuit boards, or CHA functions and DKA functions can also be respectively provided on a single control circuit board.

The cache memory 130, for example, stores user data and the like. The cache memory 130 can be constituted from nonvolatile memory for example, or it can also be constituted from volatile memory. When the cache memory 130 is constituted from volatile memory, the cache memory 130 is backed up by a battery unit 50.

Common memory (or control memory) 140 stores various control information and management information for controlling the operations of the storage controller 10. Common memory 140, for example, is constituted from nonvolatile memory. Control information and the like can be multiplexed and controlled by a plurality of common memories 140.

Furthermore, cache memory 130 and common memory 140 can either be constituted as separate memory circuit boards, or cache memory 130 and common memory 140 can be mounted on a single memory circuit board. Further, the constitution can be such that one portion of cache memory is utilized as a control area for storing control information, and another portion is utilized as a cache area for storing data.

The connection controller 150 respectively connects to the CHA 110, the DKA 120, cache memory 130, and common memory 140. Thus, the CHA 110, DKA 120, cache memory 130, and common memory 140 can all be accessed respectively. The connection controller 150, for example, is constituted from a crossbar switch or the like.

The SVP 160 is respectively connected to the CHA 110 and the DKA 120 via a LAN or other such internal network CN3. Furthermore, the SVP 160 is also connected to a power device 300. The SVP 160 is connected to the management terminal 14 by way of the communications network CN2, and collects the various states inside the storage controller 10 and provides them to the management terminal 14. Further, the management terminal 14 or management server 15 can also change the configuration of the storage controller 10 via the SVP 160.

As described hereinabove, the controller 30 can be constituted by mounting a plurality of types of boards (CHA 110, DKA 120, and so forth) in a controller enclosure. But the present invention is not limited to this, and the constitution can also be such that the above-described functions (host 13 communications function, disk drive 210 communications function, data processing functions) are provided on a single control board. In this case, it is desirable from the standpoint of enhancing the reliability of the storage controller 10 to provide a plurality of control boards to achieve a redundant constitution.

Data input/output processing by the controller 30 will be explained first. A CHA 110 stores a read command received from a host 13 in common memory 140. A DKA 120 continually references common memory 140, and when it discovers a read command, reads out data from a disk drive 210 and stores it in cache memory 130. The CHA 110 reads out the data copied to cache memory 130 and sends it to the host 13.

When a CHA 110 receives a write command from a host 13, it stores this write command in common memory 140. The CHA 110 stores the write data that it receives in cache memory 130. After storing the write data in cache memory 130, the CHA 110 reports write-complete to the host 13. In accordance with the write command stored in common memory 140, a DKA 120 reads out the write data stored in cache memory 130 and stores it in a prescribed disk drive 210. Furthermore, the constitution can also be such that after writing the write data to the disk drive 210, the DKA 120 reports write-complete to the host 13.

User data stored only in the cache memory 130 is called dirty data here, and data stored in both the cache memory 130 and a disk drive 210 is called clean data. Clean data can be deleted, and, for example, when there is not enough free space in cache memory 130, it is deleted. When a failure of some sort occurs in the power supply system of the storage controller 10, the dirty data stored in cache memory 130 is stored in a disk drive 210 within an operating period maintained by the battery unit 50.

As shown in the bottom portion of FIG. 4, a RAID group 212 is constituted by a prescribed number of disk drives 210. A RAID group 212 that utilizes RAID5 or other such parity can also be called a parity group. The RAID group 212 constitutes a redundant storage area based on a physical storage area comprising disk drives 210. One or a plurality of logical storage areas (LU) 213 can be provided in a physical storage area that this RAID group 212 provides. This logical storage area 213 is called either a logical volume or a logical storage device.

As also shown in the bottom portion of FIG. 4, the power device 300 is also provided in the storage controller 10. The power device 300 respectively provides prescribed direct-current power to the disk drives 210 and the controller 30.

Details of the power device 300 will be explained further below, but first a simple explanation will be given. The power device 300, for example, is constituted comprising a plurality of DC/DC converters 310; a plurality of power controllers 320; a plurality of AC/DC converters 40; and one fault monitor 330. The power device 300 and respective disk drives 210 are connected via wiring formed on the backboard 60.

Figure 5:
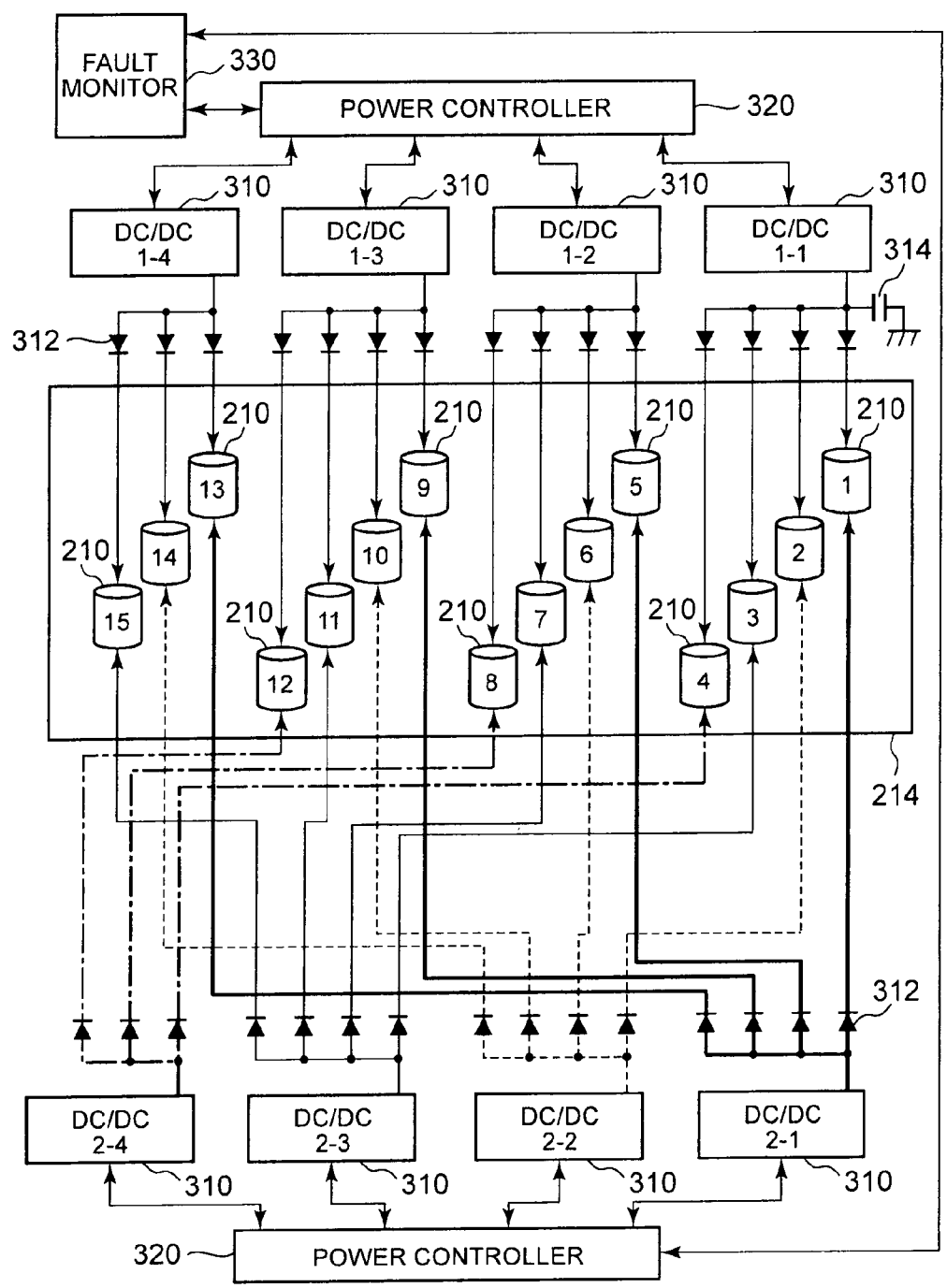
FIG. 5 is a schematic diagram showing the connection states between the respective disk drives constituting a drive group and DC/DC converters.
Figure 9:
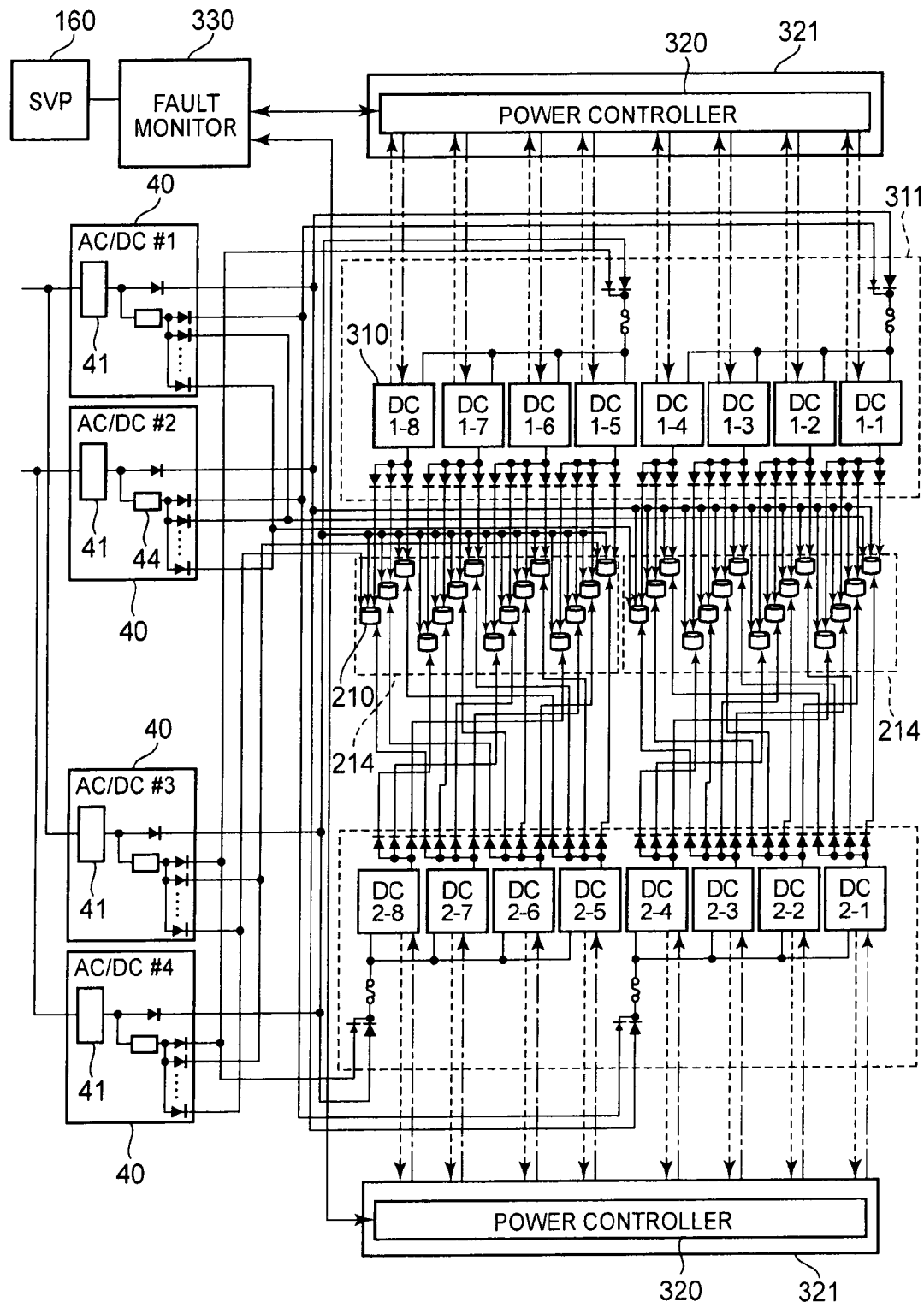
FIG. 9 is a circuit diagram showing a power source supply structure.

FIG. 5 is a schematic diagram schematically showing the power supply structure to the respective disk drives 210 making up one drive group 214. In FIG. 5, a part of the power supply structure has been removed for a better understanding of the present invention. A more detailed structure is shown in FIG. 9.

As described hereinabove, a drive group 214 of this embodiment is constituted from 15 disk drives 210. In the figure, the respective disk drives 210 are assigned numbers for identification purposes.

Then, the four disk drives 210 numbered #1 through #4, the four disk drives 210 numbered #5 through #8, the four disk drives 210 numbered #9 through #12, and the three disk drives 210 numbered #13 through #15 are respectively constituted into subgroups.

That is, a single drive group 214 made up from a total of 15 disk drives 210 is constituted from a plurality of subgroups comprising either four or three disk drives 210 each. In other words, a drive group 214 is partitioned into a plurality of subgroups in relation to the power supply.

A plurality of DC/DC converters 310 are mounted on the DC/DC board 311. Here, the DC/DC converters 310 (1-1, 1-2, 1-3, 1-4) shown in the upper portion of FIG. 5 are called first DC/DC converters, and the DC/DC converters 310 (2-1, 2-2, 2-3, 2-4) shown in the lower portion of FIG. 5 are called second DC/DC converters. In some cases, the first DC/DC converters 310(1-1 through 1-4) can also be called the main DC/DC converters, and the second DC/DC converters 310 (2-1 through 2-4) can also be called the secondary DC/DC converters.

The first DC/DC converters 310 (1-1 through 1-4) are each made correspondent to a respective subgroup. That is, first DC/DC converter 310 (1-1) is made to correspond to a subgroup made up of disk drives 210 #1 through #4, first DC/DC converter 310 (1-2) is made to correspond to a subgroup made up of disk drives 210 #5 through #8, first DC/DC converter 310 (1-3) is made to correspond to a subgroup made up of disk drives 210 #9 through #12, and first DC/DC converter 310 (1-4) is made to correspond to a subgroup made up of disk drives 210 #13 through #15, respectively.

The four direct-current outputs (for example, five volts) from first DC/DC converter 310 (1-1) are respectively inputted to each of disk drives 210 #1 through #4 via reverse current prevention elements such as diodes 312. Similarly, the four direct-current outputs from first DC/DC converters 310 (1-2) and 310 (1-3) are respectively inputted to each of disk drives 210 #5 through #8 and #9 through #12 via diodes 312. The three direct-current outputs of the final first DC/DC converter 310 (1-4), similar to above, are respectively inputted to each of disk drives 210 #13 through #15 via diodes 312.

That is, the respective first DC/DC converters 310 (1-1 through 1-4) are each made correspondent to a respective subgroup, and respectively supply direct-current power to the disk drives 210 inside the correspondent subgroups.

Second DC/DC converters 310 (2-1 through 2-4) are each made correspondent to all of the subgroups. That is, the second DC/DC converter 310 (2-1) is respectively made correspondent to all the subgroups, such as the subgroup made up of disk drives 210 #1 through #4, the subgroup made up of disk drives 210 #5 through #8, the subgroup made up of disk drives 210 #9 through #12, and the subgroup made up of disk drives 210 #13 through #15, respectively. It is the same for the other second DC/DC converters 310 (2-2, 2-3, 2-4).

The respective second DC/DC converters 310 (2-1 through 2-4) are made correspondent to each of the disk drives 210 of the respective disk drives 210 constituting the respective subgroups. That is, each second DC/DC converter 310 is respectively made correspondent to disk drives 210 selected one by one from within the respective subgroups.

The second DC/DC converter 310 (2-1) is respectively made correspondent to the #1 disk drive 210 in the first subgroup, to the #5 disk drive 210 in the second subgroup, to the #9 disk drive 210 in the third subgroup, and to the #13 disk drive 210 in the fourth subgroup. Similarly, the second DC/DC converter 310 (2-2) is respectively made correspondent to each of the #2, #6, #10 and #14 disk drives 210, the second DC/DC converter 310 (2-3) is respectively made correspondent to each of the #3, #7, #11 and #15 disk drives 210, and the second DC/DC converter 310 (2-4) is respectively made correspondent to each of the #4, #8 and #12 disk drives 210.

When the disk drives 210 constituting the respective subgroups are arranged in order from the lowest number, the first second DC/DC converter 310 (2-1) is respectively made correspondent to the disk drives 210 (#1, #5, #9, #13) of the first rank order inside the respective subgroups, the second second DC/DC converter 310 (2-2) is respectively made correspondent to the disk drives 210 (#2, #6, #10, #14) of the second rank order inside the respective subgroups, the third second DC/DC converter 310 (2-3) is respectively made correspondent to the disk drives 210 (#3, #7, #11, #15) of the third rank order inside the respective subgroups, and the fourth second DC/DC converter 310 (2-4) is respectively made correspondent to the disk drives 210 (#4, #8, #12) of the fourth rank order inside the respective subgroups.

As described above, this embodiment is constituted such that the plurality of disk drives 210 (#1 through #15) that constitute a drive group 214 are grouped into a plurality of subgroups, and direct-current power is supplied from each of a plurality of DC/DC converters 310.

In this embodiment, the structure for supplying direct-current power to the respective disk drives 210 is made redundant as described hereinabove. That is, direct-current power is supplied to each disk drive 210 inside the respective subgroups from two routes: the first DC/DC converters 310 (1-1 through 1-4), which are made correspondent to all of the disk drives 210 inside the subgroups thereof, and the second DC/DC converters 310 (2-1 through 2-4), which are made correspondent to only one disk drive 210 inside the subgroups thereof.

Therefore, for example, even if a circuit is shorted out inside any one of the disk drives 210 in a subgroup, this power failure will not adversely affect the other disk drives 210. This is because, when a short circuit occurs inside a disk drive 210, the first DC/DC converter 310 in charge of the subgroup to which this disk drive 210 belongs stops the supply of direct-current power, but direct-current power is supplied to the other disk drives 210 in this subgroup from the second DC/DC converters 310.

For example, this will be explained by giving an example in which a short circuit occurs inside the #1 disk drive 210. In this case, the protection circuit inside the first DC/DC converter 310 (1-1) operates, and the first DC/DC converter 310 (1-1) immediately stops the supply of direct-current power from the respective output terminals. As a result, direct-current power from the first DC/DC converter 310 (1-1) is not supplied to the #1, #2, #3 and #4 disk drives 210.

Similarly, second DC/DC converter 310 (2-1), which is connected to the #1 disk drive 210, also immediately stops the supply of direct-current power from the respective output terminals due to the protection circuit operating. As a result, direct-current power from the second DC/DC converter 310 (2-1) is not supplied to the #1, #5, #9 and #13 disk drives 210.

Consequently, direct-current power is not supplied to the #1 disk drive 210 in which the short circuit occurred from either the first DC/DC converter 310 (1-1) or the second DC/DC converter 310 (2-1).

However, direct-current power is respectively supplied to the other disk drives 210 (#2, #3, #4) inside the subgroup in which the power failure occurred from the other second DC/DC converters 310 (2-2, 2-3, 2-4). Therefore, in the subgroup in which the power failure occurred, only the functioning of the #1 disk drive 210 in which the power failure occurred is completely stopped, and the other disk drives 210 (#2, #3, #4) continue to operate normally. Further, direct-current power is supplied to the disk drives 210 (#5, #9, #13) inside the other subgroups associated with the stoppage of the second DC/DC converter 310 (2-1) from the first DC/DC converters 310 (1-2, 1-3, 1-4) in charge of the respective subgroups. Therefore, these disk drives 210 (#5, #9, #13) also continue to operate normally.

The power controllers 320 control the operation of the DC/DC converters 310 based on instructions from the fault monitor 330, and detect the states of the DC/DC converters 310 and notify the fault monitor 330. The power controllers 320, for example, can be constituted as hardware circuits.

In this embodiment, separate power controllers 320 are made correspondent to each of the first DC/DC converters 310 (1-1 through 1-4) and the second DC/DC converters 310 (2-1 through 2-4). That is, the one power controller 320 shown in the upper portion of FIG. 5 respectively controls the first DC/DC converters 310 (1-1 through 1-4). The other one power controller 320 shown in the lower portion of FIG. 5 respectively controls the second DC/DC converters 310 (2-1 through 2-4). The respective DC/DC converters 310 either commence or stop direct-current power supply operations in accordance with instructions from the power controllers 320. Further, the respective DC/DC converters 310 are constituted so as to output signals to the power controllers 320 concerning whether or not the DC/DC converters themselves are operating normally. Therefore, a power controller 320 can detect whether or not a failure has occurred in a DC/DC converter 310 by checking the ports via which warning signals are inputted from the respective DC/DC converters 310 under its control.

In this embodiment, as described above, separate power controllers 320 are made correspondent to each of the first DC/DC converters 310 (1-1 through 1-4) and the second DC/DC converters 310 (2-1 through 2-4). That is, the power controllers 320 are redundant. Therefore, even if some sort of failure should occur in either one of the power controllers 320, the power supply to the respective disk drives 210 can be controlled by the other power controller 320.

Furthermore, condensers 314 are respectively connected in parallel to the outputs of the respective DC/DC converters 310. For the sake of convenience, a condenser 314 is only shown for DC/DC converter 310 (1-1) in the figure. Condensers 314 connected in parallel to the respective outputs of the DC/DC converters 310 can augment output current with accumulated surplus charge. Therefore, the maximum output value of a DC/DC converter 310 need not be set at the sum of the maximum current values respectively consumed by the disk drives 210. It is sufficient for a DC/DC converter 310 to be equipped with enough output capacity to be able to output effective current. Thus, it is possible to reduce the output capacity of a DC/DC converter 310. Furthermore, the current supplied to the respective disk drives 210 by the condensers 314 is smoothed.

FIG. 6 is a schematic diagram showing an example of a table T1 for managing the disk drives 210. This table T1, for example, is stored in the common memory 140. The respective DKA 120 and SVP 160 can reference drive management table T1.

The drive management table T1, for example, correspondingly manages the items drive group number I11, subgroup number I12, drive number I13, and RAID group number I14. The drive group number I11 is information for respectively identifying each drive group 214. The subgroup number I12 is information for respectively identifying the subgroups within each drive group. The drive number I13 is information for respectively specifying the disk drives 210 comprising each subgroup. The RAID group number I14 is information for specifying the RAID group 212 to which a disk drive 210 belongs.

Using a drive management table T1 configured in this manner makes it possible to discern the drive group 214 and RAID group 212 to which a disk drive 210 belongs. Furthermore, other items in addition to the items I11 through I14 described above can also be included in table T1. For example, it is also possible to include in table T1 items such as the type of a disk drive 210 (FC disk, ATA disk, and so forth), the RAID level of the RAID group 212, and the operating state of a disk drive 210.

FIG. 7 is a schematic diagram showing an example of a table T2 for managing the first DC/DC converters 310. This table T2, for example, is stored in the common memory 140. This table T2, for example, correspondingly manages the power controller number I21, DC/DC converter number I22, terminal number I23, and drive number I24.

The power controller number I21 is information for identifying the respective power controllers 320. The DC/DC converter number I22 is information for identifying the respective DC/DC converters 310. The terminal number I23 is information for identifying the respective output terminals provided in a DC/DC converter 310. The drive number I24 is information for identifying the respective disk drives 210.

Using a first DC/DC converter management table T2 configured in this manner makes it possible to discern the disk drives 210 to which the respective DC/DC converters 310 are connected.

FIG. 8 is a schematic diagram showing an example of a table T3 for managing the second DC/DC converters 310. This table T3, for example, is also stored in the common memory 140. This table T3 correspondingly manages, for example, the power controller number I31, DC/DC converter number I32, terminal number I33, and drive number I34 just like the above-described table T2. The difference between table T2 and table T3 is the numbers of the disk drives 210 connected to a DC/DC converter.

FIG. 9 is a circuit diagram showing the power supply structure inside one HDD box 20. Fifteen (15) disk drives 210 each are provided in the upper tier and lower tier of each HDD box 20. The disk drives 210 of an upper tier and the disk drives 210 of a lower tier respectively constitute separate disk groups 214.

The DC/DC converters 310 (1-1 through 1-4) shown in the upper portion of FIG. 9 are first DC/DC converters corresponding to a first drive group 214 located on the right side in the figure. DC/DC converters 310 (1-5 through 1-8) are first DC/DC converters corresponding to a second drive group 214 located on the left side in the figure.

Similarly, the DC/DC converters 310 (2-1 through 2-4) shown in the lower portion of FIG. 9 are second DC/DC converters corresponding to the first drive group 214, and DC/DC converters 310 (2-5 through 2-8) are second DC/DC converters corresponding to the second drive group 214.

As described together with FIG. 5, the disk drives 210 in the respective drive groups 214 are grouped into a plurality of subgroups, and are supplied with direct-current power from both first DC/DC converters 310 and second DC/DC converters 310.

An AC/DC converter 40 converts inputted alternating-current power to direct-current power of around, for example, twelve volts, and is supplied respectively to DC/DC converters 310 and disk drives 210.

Figure 10:
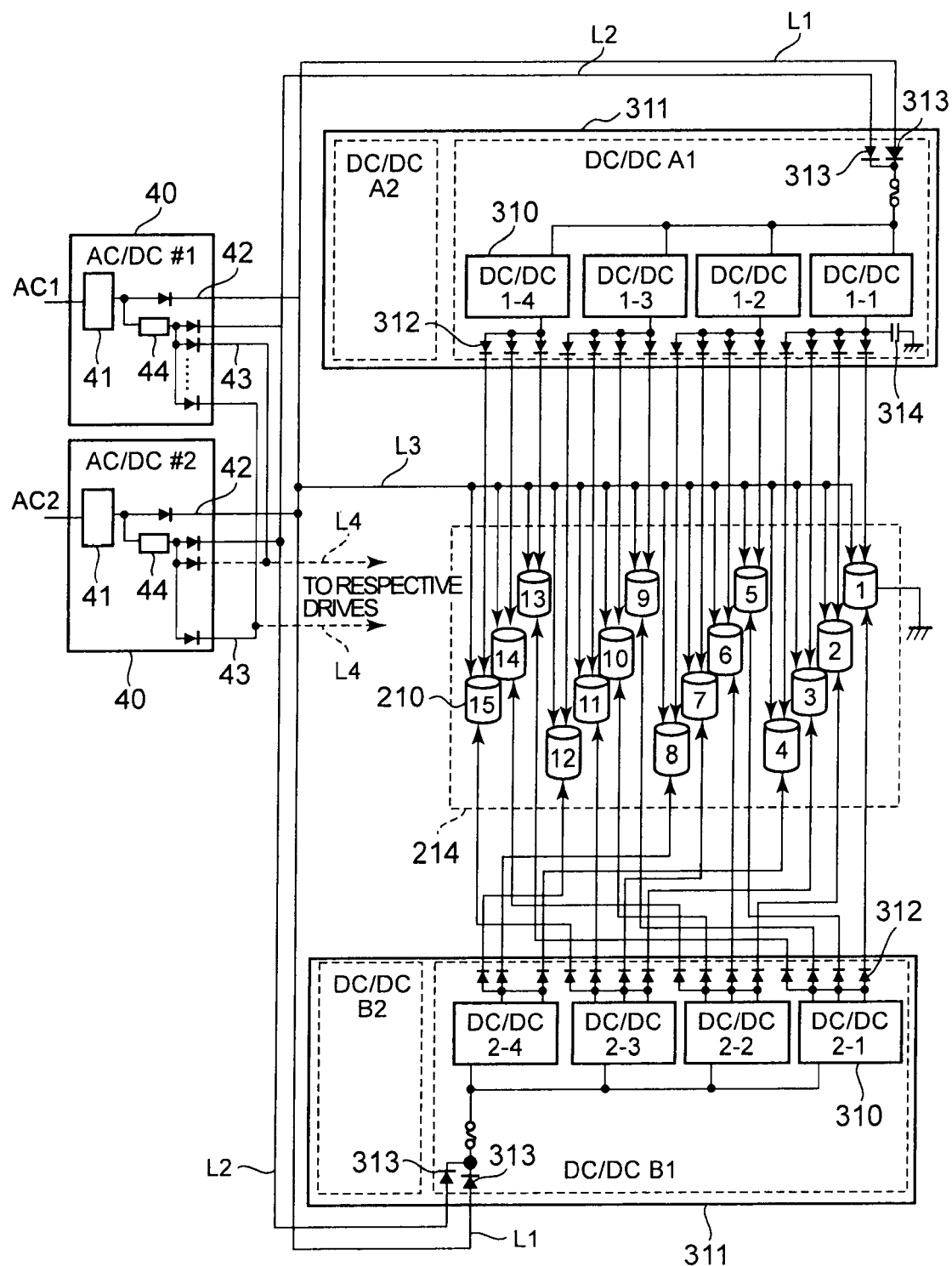
FIG. 10 is a circuit diagram showing a part of a circuit extracted from FIG. 9.

Details are provided in FIG. 10, but each AC/DC converter 40, for example, comprises a constant voltage circuit 41 and resistors 44. Of the four AC/DC converters 40 (#1 through #4) shown in FIG. 9, the #1 and #2 AC/DC converters 40 are made correspondent to the first drive group 214 shown on the right side in the figure. The #3 and #4 AC/DC converters 40 are made correspondent to the second drive group 214 shown on the left side in the figure.

As also shown in FIG. 10, outputs 42 from the respective AC/DC converters 40 (#1, #2) are respectively connected via line L1 to first DC/DC converters 310 (1-1 through 1-4) and second DC/DC converters 310 (2-1 through 2-4), which are correspondent to the first drive group 214. Diodes 313 are provided on line L1.

Further, the outputs 42 from the respective AC/DC converters 40 (#1, #2) are also respectively connected to the respective disk drives 210 inside the first drive group 214 via line L3.

In addition, the AC/DC converters 40 (#1, #2) can also output direct-current power through a plurality of reserved outputs by way of the resistors 44. One of the plurality of reserved outputs 43 is connected respectively to first DC/DC converters 310 (1-1 through 1-4) and second DC/DC converters 310 (2-1 through 2-4) via line L2. Reserved outputs from AC/DC converters 40 (#1, #2) are inputted via diodes 313 to first DC/DC converters 310 (1-1 through 1-4) and second DC/DC converters 310 (2-1 through 2-4). Therefore, since the impedance of line L1 becomes lower than that of line L2, under normal circumstances, direct-current power is supplied from the respective AC/DC converters 40 (#1, #2) via line L1. If there is a problem with the power supply from line L1, direct-current power is supplied respectively to first DC/DC converters 310 (1-1 through 1-4) and second DC/DC converters 310 (2-1 through 2-4) from line L2.

Further, the other reserved output 43 of the AC/DC converters 40 (#1, #2) is connected respectively via line L4 to the disk drives 210 inside the first disk group 214. The normal outputs 42 and reserved outputs 43 of AC/DC converter 40 (#1) and AC/DC converter 40 (#2) are connected in logical OR fashion. Therefore, even if a failure should occur in either one of the AC/DC converters 40, power of around twelve volts of direct current can be supplied respectively to the DC/DC converters 310 (1-1 through 1-4, and 2-1 through 2-4) and the disk drives 210 using the other AC/DC converter 40.

AC/DC converters 40 (#3, #4) corresponding to the second drive group 214, similar to AC/DC converters 40 (#1, #2), are connected respectively to DC/DC converters 310 (1-5 through 1-8, and 2-5 through 2-8) and the disk drives 210 of the second drive group 214. Therefore, an explanation that duplicates the above will be omitted.

Figure 11:
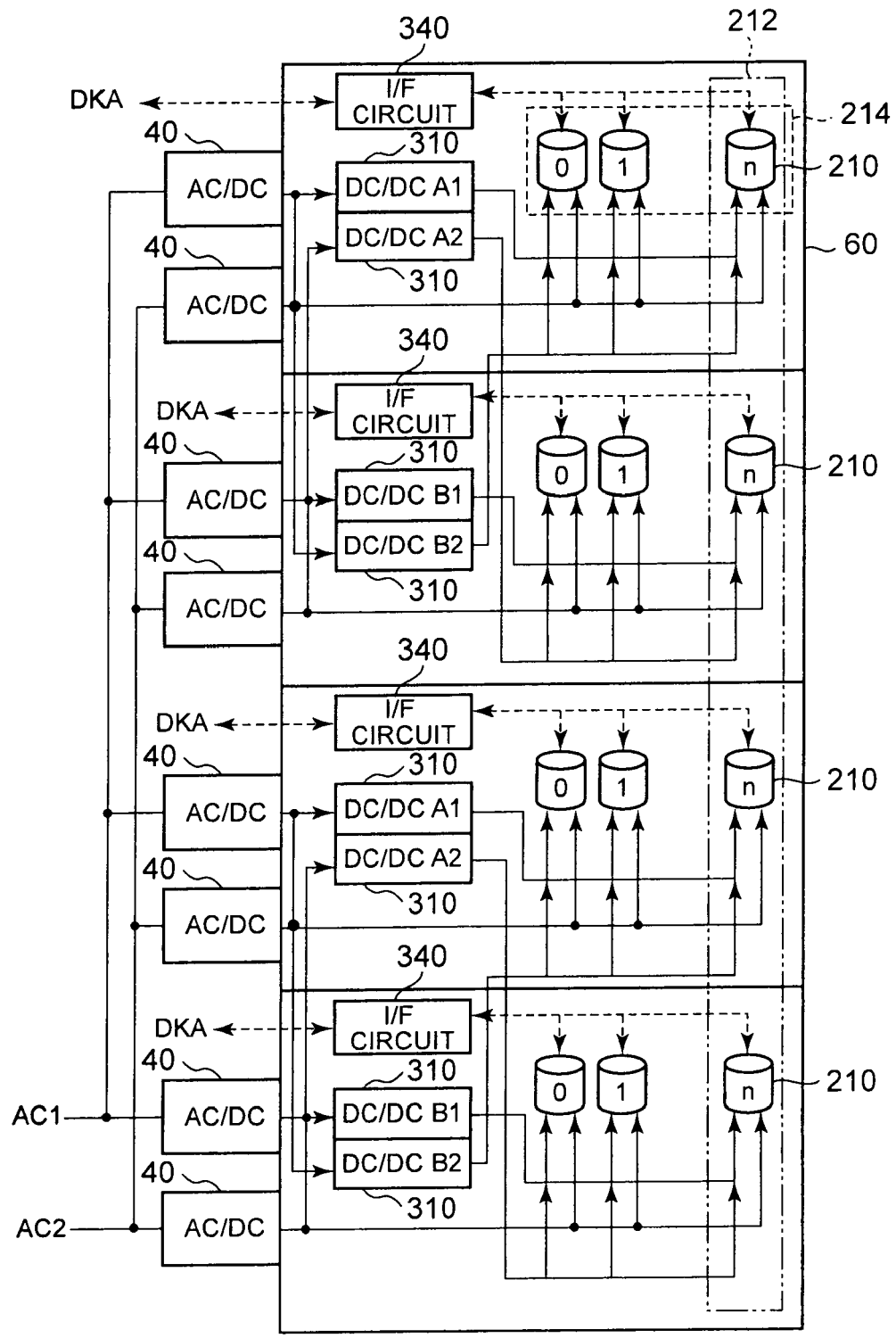
FIG. 11 is a schematic diagram showing the relationship between a drive group and a RAID group.

FIG. 11 is a schematic diagram schematically showing the relationship between a drive group 214 and a RAID group 212. Since FIG. 11 is primarily designed to show the relationship between a drive group 214 and a RAID group 212, the constitution of the power supply system has been simplified.

The respective disk drives 210 inside a drive group 214 are connected to a DKA 120 via an interface circuit (I/F circuit in the figure) 340. This interface circuit 340 controls the exchange of data between the DKA 120 and the respective disk drives 210.

It is desirable that a RAID group 212 be constituted from disk drives 210 belonging to respectively different drive groups 214. That is, the respective disk drives 210 constituting a RAID group 212 utilize respectively different power supply systems. Thus, even if a failure should occur in any power supply system, it is possible to prevent the affect from spreading to the other disk drives 210 inside the same RAID group 212.

Figure 12:
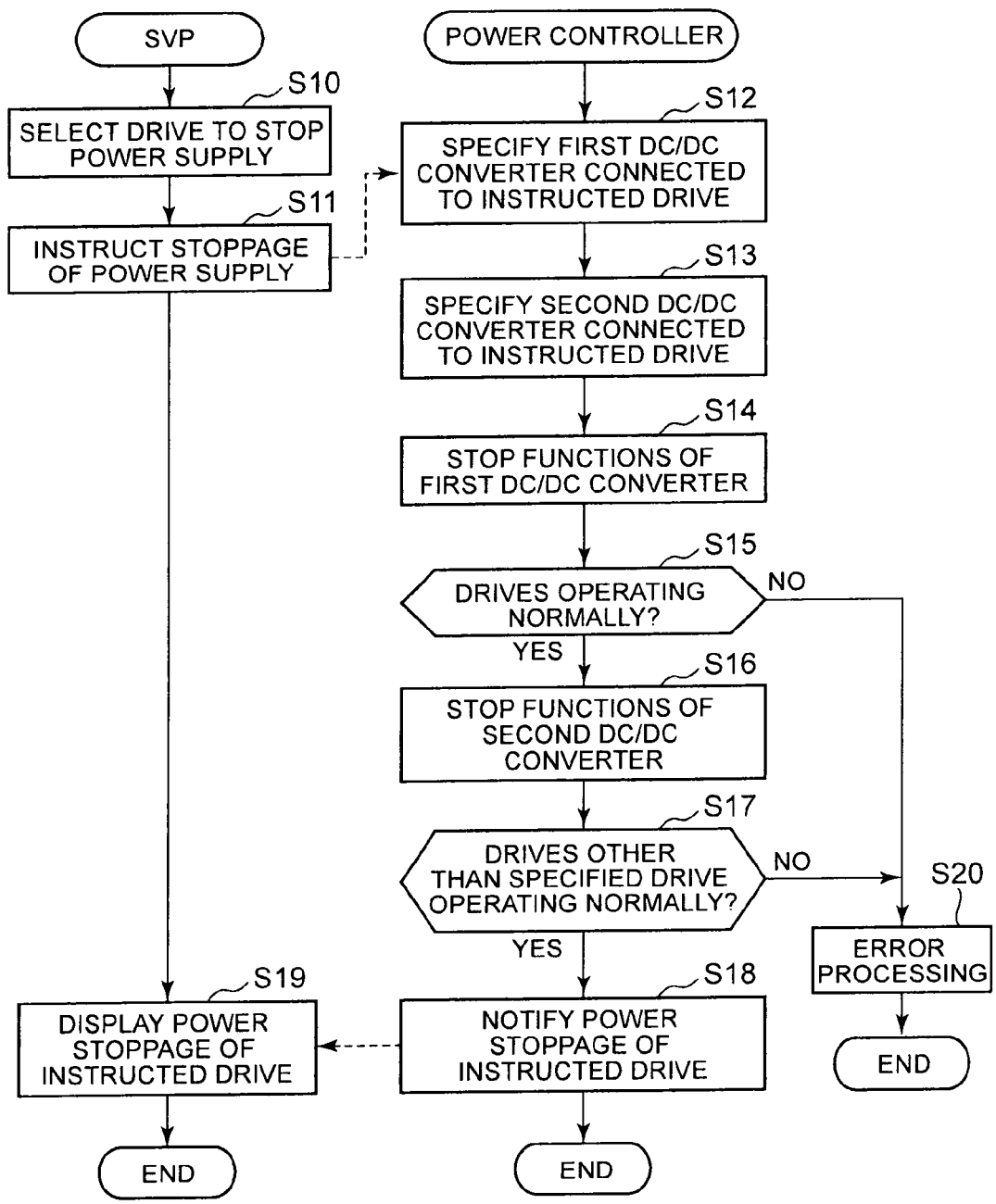
FIG. 12 is a flowchart showing the process when the power supply to disk drives is shut down in disk drive units.

FIG. 12 is a flowchart showing the process for individually stopping the supply of direct-current power to each disk drive 210. The respective flowcharts described here in below present an overview of the processing, and will differ from actual programs in some cases. Further, steps can be replaced, deleted or added as needed. A step is abbreviated as "S" in the figures.

Furthermore, in the following explanation, the power controller 320 will be the focus of the explanation, but the constitution can also be such, for example, that the DKA 120 and fault monitor 330 carry out the power control described here in below.

Using the management terminal 14 and SVP 160, a user selects a disk drive 210 to which the power supply is to be stopped (S10). The SVP 160 instructs the power controller 320 to stop the supply of direct-current power to the selected disk drive 210 (S11). This stop command is notified to the power controller 320 in charge of the selected disk drive 210 via the fault monitor 330.

Upon receiving the above-mentioned stop command, the power controller 320 specifies the first DC/DC converter 310 connected to the selected disk drive 210 (S12). In addition, the power controller 320 specifies the second DC/DC converter 310 connected to the selected disk drive 210 (S13).

The power controller 320 stops the direct-current power output of the first DC/DC converter 310 specified in S12 (S14). Subsequent to stopping the output of direct-current power from this first DC/DC converter 310, the power controller 320 also determines whether or not the disk drives 210 are operating normally (S15).

When it is determined that the disk drives 210 are operating normally (S15: YES), the power controller 320 stops the direct-current power output of the second DC/DC converter 310 specified in S13 (S16). Making the stoppage time of the first DC/DC converter 310 and the second DC/DC converter 310 differ can further enhance reliability. The constitution can also be such that the first DC/DC converter 310 and the second DC/DC converter 310 are stopped at the same time instead.

The power controller 320 determines whether or not direct-current power is being supplied to other disk drives 210 beside the disk drive 210 instructed from the SVP 160 (S17). When only the instructed disk drive 210 is stopped, and the disk drives 210 other therethan are operable (S17: YES), the power controller 320 notifies the SVP 160 via the fault monitor 330 to the effect that the power supply to the instructed disk drive 210 is stopped (S18).

The SVP 160 notifies the management terminal 14 to the effect that the power supply to the disk drive 210 instructed from the management terminal 14 is stopped (S19). The fact that the power supply to the disk drive 210 specified by the user is stopped is displayed on the screen of the management terminal 14. Thus, the user can remove the desired disk drive 210 from the HDD box 20. Then, the user mounts a new disk drive 210 in the HDD box 20.

Figure 13:
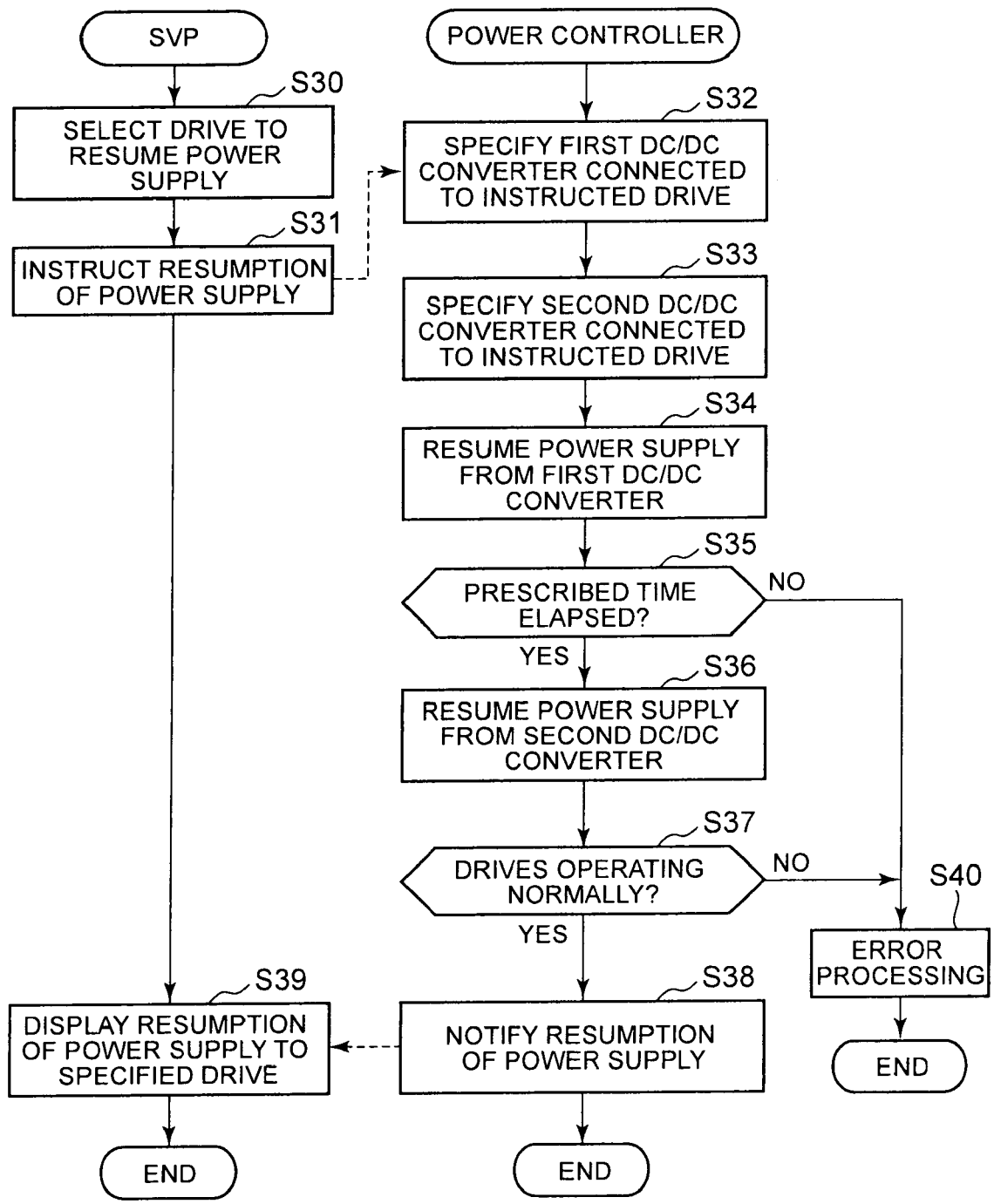
FIG. 13 is a flowchart showing the process when the power supply to disk drives is commenced in disk drive units.

FIG. 13 is a flowchart showing the process for individually starting the supply of direct-current power to each disk drive 210. Using the management terminal 14 and SVP 160, a user selects the number of a disk drive 210 to which the supply of direct-current power is to be started (S30). The SVP 160 instructs the power controller 320 to commence supplying power to the disk drive 210 selected by the user (S31).

The power controller 320 respectively specifies the first DC/DC converter 310 and second DC/DC converter 310, which are connected to the disk drive 210 instructed from the SVP 160 (S32, S33).

The power controller 320 first resumes the supply of direct-current power from the first DC/DC converter 310 specified in S32 (S34). The power controller 320, after waiting for a prescribed period of time to elapse (S35), resumes the supply of direct-current power from the second DC/DC converter 310 specified in S33 (S36).

The prescribed period of time referred to here is a time set in advance by either the user or at the time of factory shipping. As the prescribed time, for example, the time from when direct-current power was applied to a disk drive 210 until the disk drive 210 achieves stable operation can be set. That is, even when direct-current power is supplied to a new disk drive 210, it will take some time before this new disk drive 210 constitutes a usable state. Accordingly, the power controller 320 waits in S35 for the passage of time required for the disk drive 210 to ramp up.

Once the prescribed time has elapsed (S35: YES), the power controller 320 resumes the supply of direct-current power from the second DC/DC converter 310 specified in S33 (S36). Then, the power controller 320 ascertains whether or not the respective disk drives 210 are operating normally (S37).

After ascertaining the normal operation of the respective disk drives 210 (S37: YES), the power controller 320 notifies the SVP 160 via the fault monitor 330 to the effect that the supply of power to the disk drive 210 specified from the SVP 160 has been started (S38).

The SVP 160 notifies the management terminal 14 to the effect that the supply of power to the disk drive 210 instructed from the management terminal 14 has been started (S39). The fact that the supply of power to the disk drive 210 selected by the user has been completed normally is thereby displayed on the screen of the management terminal 14.

Thus, in this embodiment, it is possible to individually control the ON/OFF of the power supply to each of the disk drives 210. Therefore, for example, when a specific disk drive 210 is to be replaced during maintenance work, a user can stop the power supply to the specified disk drive 210, and thereafter remove this specified disk drive 210 from the enclosure. Then, after the user has replaced the specified disk drive 210 with a new disk drive 210, the power supply to this new disk drive 210 can be resumed.

Therefore, in this embodiment, it is not necessary to provide an electrical circuit for so-called hot swapping for either removing or mounting a disk drive 210 in a state in which power is being supplied as-is. Thus, the circuit structure of a disk drive 210 can be simplified, and disk drive 210 manufacturing costs can be reduced.

Figure 14:
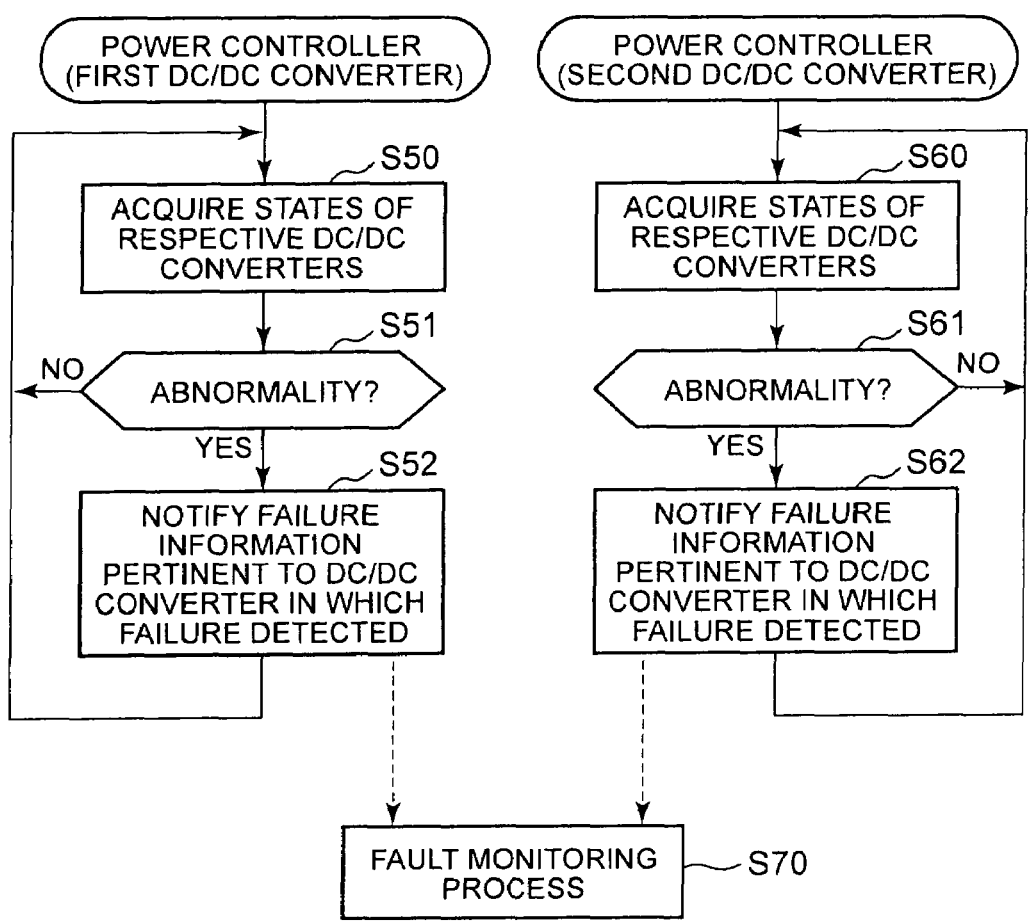
FIG. 14 is a flowchart showing the process for a power controller monitoring the state of a DC/DC converter.

FIG. 14 is a flowchart showing the DC/DC converter monitoring process by the respective power controllers 320. The first power controller 320 ascertains the signal levels of the warning signals from the respective first DC/DC converters 310, and respectively acquires the state of each first DC/DC converter 310 (S50).

The first power controller 320 determines whether or not an abnormality has occurred in any one of the first DC/DC converters 310 (S51). When a warning signal is inputted from any one or more first DC/DC converters 310 (S51: YES), the first power controller 320 notifies the fault monitor 330 of failure information relevant to the first DC/DC converter 310 in which the abnormality was detected (S52). Failure information pertaining to a first DC/DC converter, for example, can comprise a DC/DC converter number for specifying the first DC/DC converter 310 in which the abnormality was detected, the time at which the abnormality was detected, and the type of abnormality.

Similar to above, the second power controller 320 also confirms warning signals from the respective second DC/DC converters 310 (S60), and when an abnormality is detected in any of the second DC/DC converters 310 (S61: YES), notifies failure information to the fault monitor 330 (S62). The fault monitor 330, based on a notification from the power controllers 320, executes a failure monitoring process (S70), which will be explained below together with FIG. 15.

Figure 15:
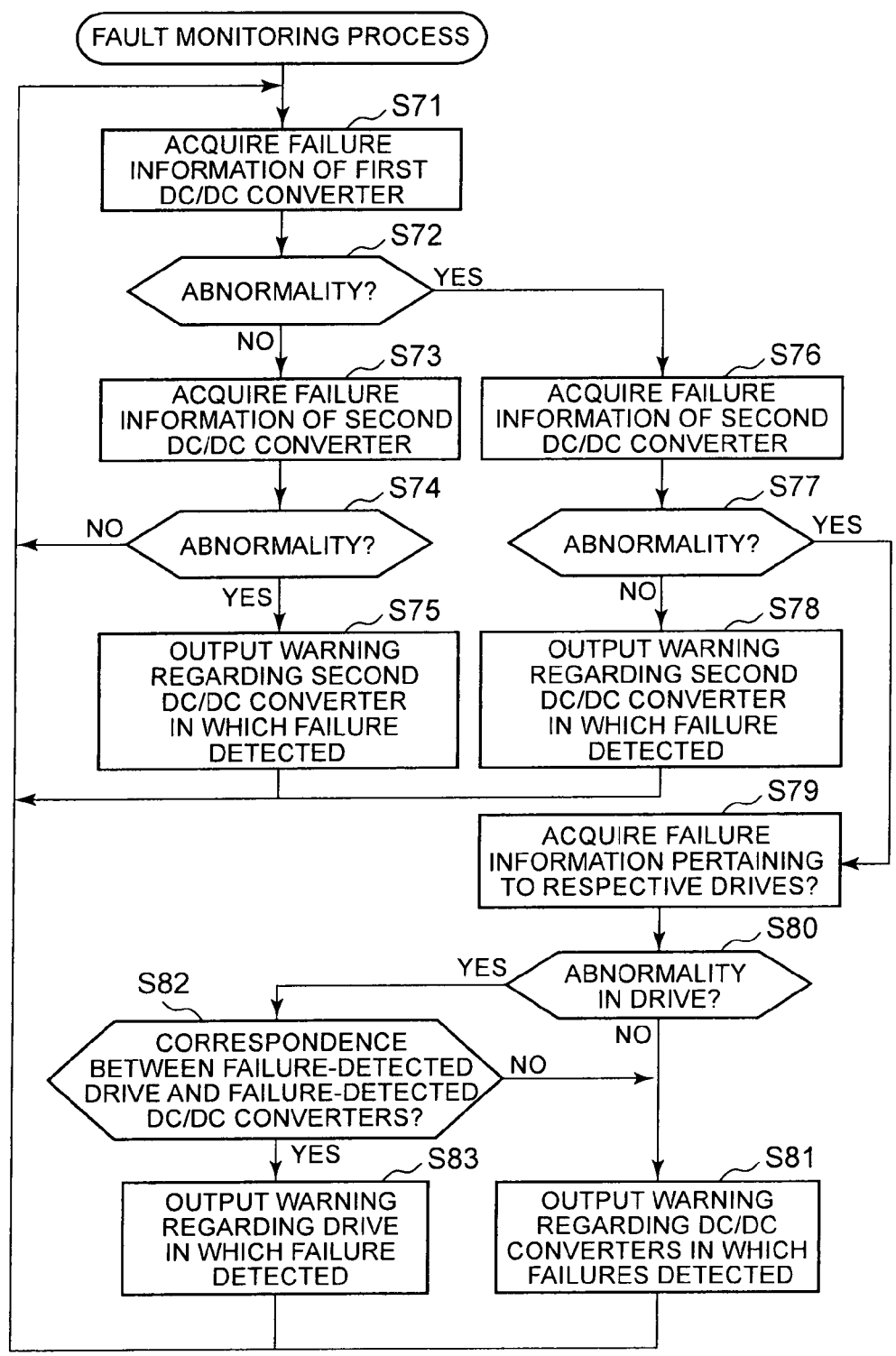
FIG. 15 is a flowchart showing a failure monitoring process.

FIG. 15 is a flowchart showing a failure monitoring process indicated in S70 in FIG. 14. This failure monitoring process is executed by the fault monitor 330. The constitution can also be such that, for example, the DKA 120 executes failure monitoring processing instead.

The fault monitor 330 acquires failure information pertaining to the first DC/DC converters 310 (S71), and determines whether or not an abnormality has occurred (S72). When no abnormality has occurred in the first DC/DC converters 310 (S72: NO), the fault monitor 330 acquires failure information pertaining to the second DC/DC converters 310 (S73).

When no abnormality has occurred in the second DC/DC converters 310 (S74: NO), processing returns to S71, and monitoring is repeated. When it is determined that a failure (abnormality) has occurred in any of the second DC/DC converters 310 (S74: YES), the fault monitor 330 outputs a warning signal regarding the second DC/DC converter 310 in which the failure was detected (S75).

Based on this warning signal, the SVP 160 can send a warning message to the management terminal 14. The management terminal 14 can warn the management server 15 based on the warning message received from the SVP 160. The management server 15, based on the warning received from the management terminal 14, for example, can notify maintenance personnel and the user of the failure in the storage controller 10 using communications means such as electronic mail or a telephone.

In the meantime, when it is determined that a failure has occurred in any of the first DC/DC converters 310 (S72: YES), the fault monitor 330 acquires failure information pertaining to the second DC/DC converters 310 (S76). The fault monitor 330 determines whether or not a failure has occurred in any of the second DC/DC converters 310 (S77).

When an abnormal state is not detected in any of the second DC/DC converters 310 (S77: NO), the fault monitor 330 outputs a warning signal regarding the first DC/DC converter 310 in which an abnormality was detected (S78).

When the determination in S77 is "YES", it is a situation in which the occurrence of failures was detected in both a first DC/DC converter 310 and a second DC/DC converter 310. Accordingly, the fault monitor 330 respectively acquires failure information pertaining to the disk drives 210 (S79), and determines if an abnormality has occurred in any of the disk drives 210 (S80). The fault monitor 330, for example, can detect if there is an abnormality in a disk drive 210 based on the communication states between the disk drives 210 and the interface circuits 340.

When an abnormality is identified in any of the disk drives 210 (S80: YES), the fault monitor 330 determines whether or not the disk drive 210 in which an abnormality was detected in S80 corresponds to the first DC/DC converter 310 and second DC/DC converter 310 in which abnormalities were detected in S72 and S77 (S82). That is, the fault monitor 330 determines if abnormalities were detected in the first DC/DC converter 310 and second DC/DC converter 310 that are respectively connected to the disk drive 210 in which an abnormality was detected.

When it is determined that an abnormal state has occurred in the first DC/DC converter 310 and second DC/DC converter 310 that are respectively connected to the disk drive 210 in which an abnormality was detected (S82: YES), the fault monitor 330 outputs a warning regarding the disk drive 210 in which an abnormal state was detected in S80 (S83). When the disk drive 210 in which an abnormality was detected does not correspond to the first DC/DC converter 310 and second DC/DC converter 310 in which abnormalities were detected (S80: NO), the fault monitor 330 outputs a warning regarding the first DC/DC converter 310 and second DC/DC converter 310 in which abnormalities were detected in S72 and S77 (S81).

For example, when some sort of abnormality, such as a delayed response, is identified in the data input/output to a disk drive 210, and abnormalities are detected in both DC/DC converters 310 connected to this disk drive 210, a power failure can be considered to have occurred inside the disk drive 210. This is because, as described hereinabove, when a short circuit or other such power failure occurs on the inside of a disk drive 210, the protection circuits of the DC/DC converters 310 connected to this disk drive 210 operate, and these DC/DC converters 310 stop operating.

Thus, in this embodiment, it is possible to specify a disk drive 210 in which it is highly likely that a power failure has occurred based on the presence of abnormalities in the respective DC/DC converters 310 and disk drives 210. Therefore, it is possible to readily specify a failure location and reason, and to enhance the productivity of maintenance work.

A storage controller 10 power device 300 according to this embodiment comprises the above-described constitution. Therefore, as already discussed, in addition to heightening reliability by making the power supply structure to the disk drives 210 redundant, it is also possible to reduce the manufacturing costs and enhance the productivity of the disk drives 210 and power device 300.

Further, in this embodiment, the constitution is such that it is possible to individually control the starting and stopping of the power supply to each disk drive 210 in accordance with a redundant power supply structure. Therefore, a targeted disk drive 210 can be removed after stopping the supply of direct-current power to the targeted disk drive 210. Then, direct-current power can be supplied after the removed disk drive 210 or a new disk drive 210 has been mounted. Therefore, for example, working efficiency is improved when changing the settings of a disk drive 210, or when substituting a new disk drive 210. This is because it is possible to individually control the power supply to a targeted disk drive 210 alone without affecting the power supply to other disk drives 210 at all. Further, since power control can be carried out individually, there is also no need to provide a hot swap-enabling mechanism inside a disk drive 210. Therefore, since a disk drive 210 of this embodiment is not equipped with a built-in electrical circuit for hot swapping and a DC/DC converter, the constitution can be simplified more than a conventional disk drive and manufacturing costs can be reduced.

Second Embodiment

A second embodiment of the present invention will be explained on the basis of FIGS. 16 and 17. This embodiment is equivalent to a variation of the first embodiment.

Figure 16:
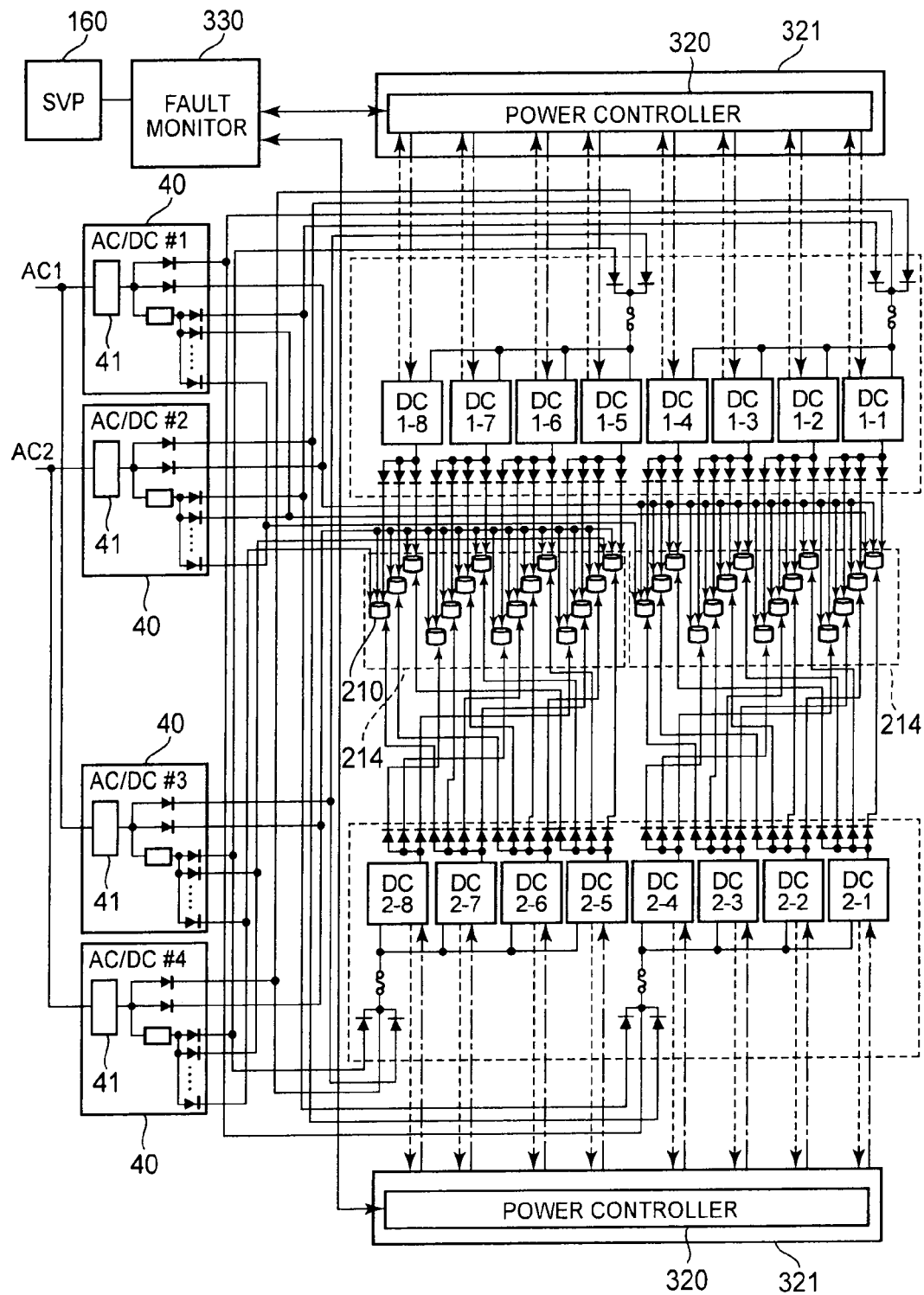
FIG. 16 is a circuit diagram showing a power supply structure related to a second embodiment of the present invention.

FIG. 16 is a circuit diagram showing the power supply structure inside one HDD box 20 according to this embodiment. In this embodiment, the constitution is such that respective alternating-current power sources AC1, AC2 can be used equivalently.

As shown in FIG. 16, direct-current power is directly supplied from AC/DC converter 40 (#1) to the respective DC/DC converters 310 (1-1 through 1-4) and (2-1 through 2-4) corresponding to a first drive group 214. Directly supplied means inputted without going through diodes 313A, 313B (Refer to FIG. 17).

Figure 17:
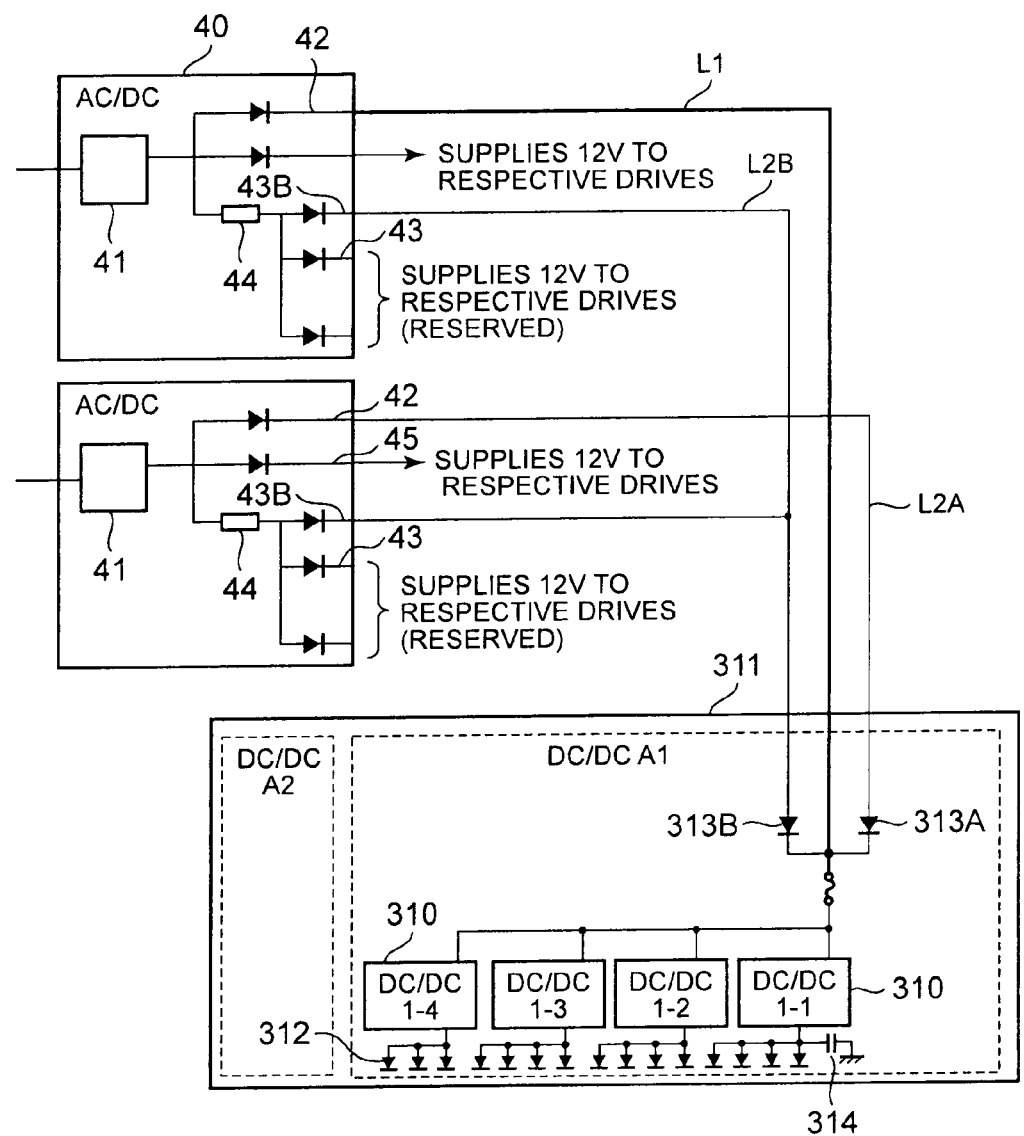
FIG. 17 is a circuit diagram showing part of a circuit extracted from FIG. 16.

Further, as shown in FIG. 17, direct-current power is supplied via a diode 313A from AC/DC converter 40 (#2) to respective DC/DC converters 310 (1-1 through 1-4) and (2-1 through 2-4).

In addition, as shown in FIG. 17, the reserved outputs 43B of AC/DC converters 40 (#1, #2) are inputted via diode 313B to the respective DC/DC converters 310 (1-1 through 1-4) and (2-1 through 2-4).

Similarly, direct-current power is directly supplied from AC/DC converter 40 (#4) to DC/DC converters 310 (1-5 through 1-8) and (2-5 through 2-8), respectively. Further, direct-current power is supplied via a diode from AC/DC converter 40 (#3) to DC/DC converters 310 (1-5 through 1-8) and (2-5 through 2-8). In addition, the reserved outputs of AC/DC converters 40 (#3, #4) are inputted via another diode to DC/DC converters 310 (1-5 through 1-8) and (2-5 through 2-8).

Here, too, as with the above-mentioned embodiment, alternating-current power is supplied to AC/DC converters 40 (#1, #3) from a first alternating-current power supply AC1, and alternating-current power is supplied to AC/DC converters 40(#2, #4) from a second alternating-current power supply AC2.

Viewed from the standpoint of the DC/DC converters 310, as shown in FIG. 17, the respective DC/DC converters 310 comprise a total of three power input channels: line L1 through which direct-current power is directly inputted, line L2A through which direct-current power is inputted via diode 313A, and line L2B through which direct-current power is inputted via diode 313B.

Therefore, since the impedance of line L1 is the lowest of the respective lines L1, L2A, L2B, under normal circumstances, direct-current power is supplied to the DC/DC converters 310 via direct input line L1.

In other words, the respective DC/DC converters 310 (1-1 through 1-4) and (2-1 through 2-4) corresponding to the first drive group 214 utilize alternating-current power from the first alternating-current power supply AC1, and the respective DC/DC converters 310 (1-5 through 1-8) and (2-5 through 2-8) corresponding to the second drive group 214 utilize alternating-current power from the second alternating-current power supply AC2.

Therefore, the respective drive groups 214 can make use of respectively different alternating-current power supplies AC1, AC2. If the respective drive groups 214 comprise a RAID relationship, such as, for example, RAID1, the disk drives 210 inside the respective drive groups 214 always constitute the same number. In this case, disk drives 210 are simultaneously augmented or decreased in the respective drive groups 214. Therefore, even if storage capacity is either increased or decreased, it is possible to utilize the respective alternating-current power supplies AC1, AC2 equivalently.

This embodiment, which is constituted in this manner, displays the same operation and effect as the first embodiment. In addition to this, in this embodiment, it is possible to utilize a plurality of alternating-current power supplies AC1, AC2 equivalently.

Third Embodiment

Figure 18:
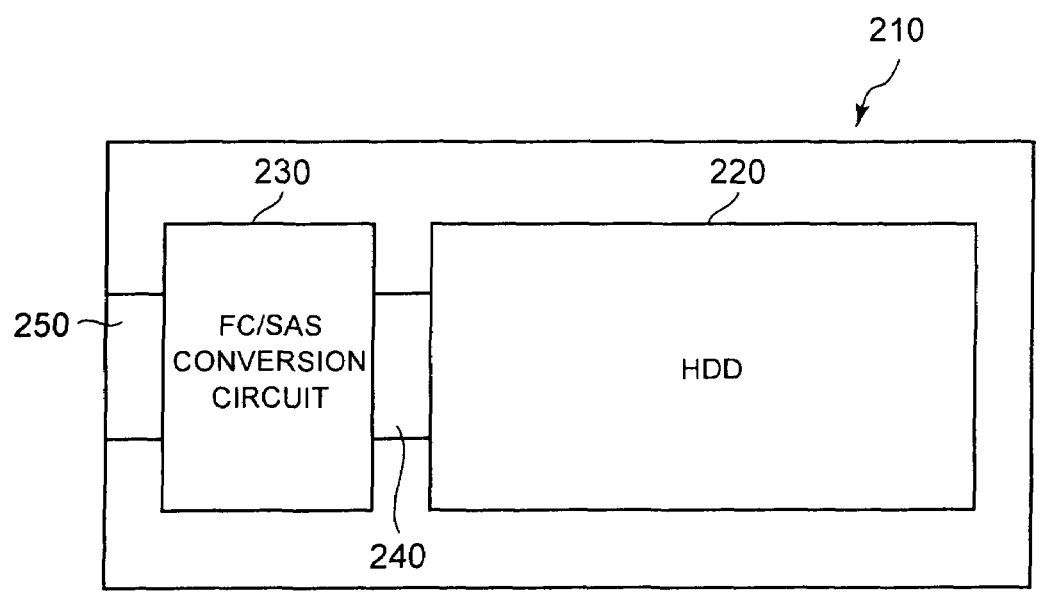
FIG. 18 is a schematic diagram showing the constitution of a disk drive being supplied with power by a power device related to a third embodiment of the present invention.

A third embodiment will be explained based on FIG. 18. In this embodiment, a situation in which a SAS or other such different type disk is used instead of a FC disk will be explained.

A disk drive 210, for example, is constituted comprising a drive main unit 220, a protocol conversion circuit 230, an internal connector 240 and an external connector 250. The drive main unit 220, for example, is constituted comprising a disk, a magnetic head, a spindle motor, and so forth. The protocol conversion circuit 230, for example, mutually converts different protocols, such as FC and SAS, making data input/output possible. The internal connector 240 electrically connects the protocol conversion circuit 230 to the drive main unit 220. The external connector 250 electrically connects the disk drive 210 to the backboard 60.

Thus, building the protocol conversion circuit 230 into the disk drive 210 makes it possible to utilize a different type disk, such as SAS, in an FC-specification storage controller. Accordingly, the disk drive 210 can be utilized by mixing different type disks without changing to another configuration, enhancing usability.

The present invention is not limited to the embodiments described above. A person having ordinary skill in the art will be able to make various additions and changes without departing from the scope of the present invention. For example, the respective embodiments can be combined as the occasion demands.

What is claimed is:

1. A power device configured to supply power to a plurality of storage devices comprising a first direct-current power input port and a second direct-current power input port, comprising:

a plurality of first direct-current power units configured to supply direct-current power to the first direct-current power input ports of the respective storage devices;

a plurality of second direct-current power units configured to supply, to the second direct-current power input ports of the respective storage devices, the same direct-current power as the direct-current power supplied from the first direct-current power units to the first direct-currently power input ports of the respective storage devices; and a power controller configured to control respectively the first direct-current power units and the second direct-current power units, wherein the storage devices are grouped into a plurality of subgroups each comprising a plurality of the storage devices, the first direct-current power units and the second direct-current power units are respectively provided in the same numbers as the numbers of the subgroups, the first direct-current power units are respectively configured correspondent to one subgroup of the subgroups, and to respectively supply the direct-current power to the first direct-current power input ports of the storage devices inside a corresponding one of the subgroups, and the second direct-current power units are respectively configured correspondent to all of the subgroups, and to respectively supply, with respect to each of the subgroups, the direct-current power to the second direct-current power input port of one storage device of the storage devices inside the subgroups, wherein the storage devices configured to supply direct-current power by the first direct-current power units and the second direct-current power units belong to different RAID groups from each other.

2. The power device according to claim 1,
wherein the power controller is further configured to individually control the supply and cutoff of power to each storage device by controlling power supply operations of a prescribed first direct-current power unit and a prescribed second direct-current power unit, which respectively supply the direct-current power to a prescribed storage device, of the respective first direct-current power units and second direct-current power units.

3. The power device according to claim 2,
wherein the power controller is further configured to supply direct-current power to the prescribed storage device by respectively stopping the power supply of the prescribed first direct-current power unit and the prescribed second direct-current power unit, stopping the power supply to the prescribed storage device, and respectively resuming the power supply of the prescribed first direct-current power unit and the prescribed second direct-current power unit.

4. The power device according to claim 3,
wherein the power controller is further configured to first resume the power supply of any one of either the prescribed first direct-current power unit or the prescribed second direct-current power unit, and thereafter, to resume the power supply of the other of the prescribed first direct-current power unit or the prescribed second direct-current power unit.

5. The power device according to claim 4,
wherein the power controller is further configured to first resume the power supply of any one of either the prescribed first direct-current power unit or the prescribed second direct-current power unit, and thereafter, following the passage of a preset prescribed time, resumes the power supply of the other.

6. A power supplying method for supplying power from a plurality of first direct-current power units and a plurality of second direct-current power units to a plurality of storage devices each having a first direct-current power input port configured to receive direct-current power from the first direct-current power units and a second direct-current power input port configured to receive from the second direct-current power units the same direct current power as that supplied from the first direct-current power units to the first direct-current input port, the method comprising the steps of:

grouping the storage devices into a plurality of subgroups each comprising a plurality of the storage devices, wherein the first direct-current power units and the second direct-current power units are respectively provided in the same numbers as the numbers of the subgroups, setting a correspondence between respective first direct-current power units and one subgroup of the subgroups, and respectively supplying direct-current power from the first direct-current power units to the first direct-current power input ports of storage devices belonging to a first RAID group inside a corresponding one of the subgroups, and setting a correspondence between respective second direct-current power units and all of the subgroups, and respectively supplying, from the second direct-current power units with respect to each of the subgroups, direct-current power to the second direct-current power input port of one storage device of the storage devices belonging to a second RAID group different from the first RAID group inside the subgroups.

* * * * *